US011014791B2

(12) United States Patent
Magill et al.

(10) Patent No.: US 11,014,791 B2
(45) Date of Patent: May 25, 2021

(54) SELF-RAISING WINCH BOOM AND CONTROL SYSTEMS AND METHODS ASSOCIATED THEREWITH

(71) Applicant: Vermeer Manufacturing Company, Pella, IA (US)

(72) Inventors: Joshua Martin Magill, Polk City, IA (US); Austin Tunis Ver Meer, Leighton, IA (US); David Arden Greiner, Colo, IA (US); Matthew Stephen Vos, Pella, IA (US)

(73) Assignee: Vermeer Manufacturing Company, Pella, IA (US)

( * ) Notice: Subject to any disclaimer, the term of this patent is extended or adjusted under 35 U.S.C. 154(b) by 209 days.

(21) Appl. No.: 16/367,478

(22) Filed: Mar. 28, 2019

(65) Prior Publication Data

US 2019/0308854 A1     Oct. 10, 2019

Related U.S. Application Data

(60) Provisional application No. 62/653,059, filed on Apr. 5, 2018.

(51) Int. Cl.
*B66D 1/48*     (2006.01)
*A01G 3/00*     (2006.01)
*B66D 1/12*     (2006.01)

(52) U.S. Cl.
CPC .............. *B66D 1/485* (2013.01); *A01G 3/002* (2013.01); *B66D 1/12* (2013.01); *B66D 2700/0183* (2013.01)

(58) Field of Classification Search
None
See application file for complete search history.

(56) References Cited

U.S. PATENT DOCUMENTS

| 3,048,371 | A | * | 8/1962 | Klimek, Jr. | B66C 23/36 |
| | | | | | 254/362 |
| 3,097,749 | A | * | 7/1963 | Hahn | B66C 23/82 |
| | | | | | 212/293 |
| 3,141,654 | A | | 7/1964 | Bergerson et al. | |
| 3,165,157 | A | * | 1/1965 | Carbert | E21B 19/087 |
| | | | | | 173/28 |
| 3,390,785 | A | * | 7/1968 | Lado | B66D 1/08 |
| | | | | | 212/289 |
| 3,732,743 | A | * | 5/1973 | Ballard | F16H 19/00 |
| | | | | | 74/89.18 |
| 3,776,518 | A | * | 12/1973 | Witwer | B66D 5/26 |
| | | | | | 212/287 |

(Continued)

FOREIGN PATENT DOCUMENTS

WO     WO-2014200354 A1 * 12/2014 ............... B66D 1/08

*Primary Examiner* — Emmanuel M Marcelo
(74) *Attorney, Agent, or Firm* — Michael Best and Friedrich LLP

(57) ABSTRACT

A winch boom system and method includes a frame, a shaft supported by the frame, and a winch drum attached to the shaft such that rotation of the shaft about a shaft axis rotates the winch drum. A boom is pivotably coupled to the frame, the boom defining a cavity in which the winch drum is positioned. A winch rope is wound about the winch drum, passing through the cavity of the boom, and extending from the boom at a point distal from the winch drum.

32 Claims, 26 Drawing Sheets

(56) References Cited

U.S. PATENT DOCUMENTS

| | | | |
|---|---|---|---|
| 5,010,933 A * | 4/1991 | Doyle | A01G 23/006 |
| | | | 144/336 |
| 6,138,932 A * | 10/2000 | Moore | A01G 3/002 |
| | | | 241/101.76 |
| 6,446,889 B1 | 9/2002 | Moore | |
| 6,955,310 B1 * | 10/2005 | Morey | A01G 3/002 |
| | | | 144/430 |
| 7,562,837 B2 * | 7/2009 | Brand | A01G 3/002 |
| | | | 241/101.2 |
| 7,819,348 B2 | 10/2010 | Bouwers et al. | |
| 7,913,726 B1 * | 3/2011 | Honnell | B27L 7/00 |
| | | | 144/4.6 |
| 9,233,375 B2 * | 1/2016 | Kennedy | B27L 11/00 |
| 9,321,185 B2 | 4/2016 | Satterwhite | |
| 9,636,687 B2 | 5/2017 | Kennedy et al. | |
| 9,656,269 B2 | 5/2017 | Kennedy et al. | |
| 2003/0213765 A1 * | 11/2003 | St-Germain | E04G 1/20 |
| | | | 212/294 |
| 2007/0001038 A1 | 1/2007 | Bouwers et al. | |
| 2007/0104560 A1 | 5/2007 | Hall | |
| 2009/0095828 A1 | 4/2009 | Bouwers et al. | |
| 2010/0072156 A1 | 3/2010 | Mentink et al. | |
| 2012/0160796 A1 * | 6/2012 | Weckbecker | B66D 1/12 |
| | | | 212/284 |
| 2014/0263775 A1 * | 9/2014 | Satterwhite | B66D 1/36 |
| | | | 241/28 |
| 2017/0362067 A1 * | 12/2017 | Hiekata | B66D 1/16 |
| 2020/0165110 A1 * | 5/2020 | Wilson | A01M 31/006 |

* cited by examiner

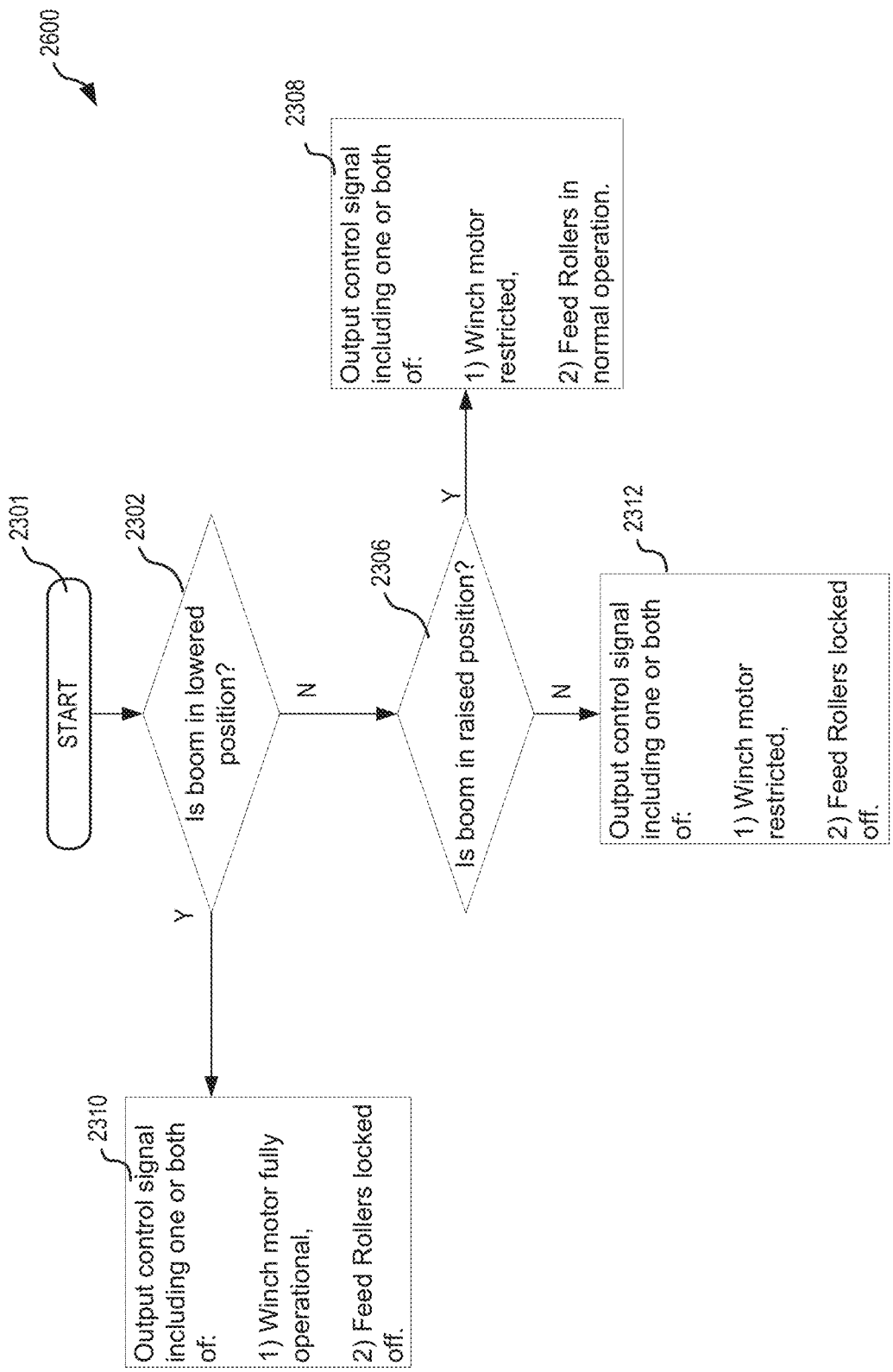

SELF-RAISING WINCH BOOM AND CONTROL SYSTEMS AND METHODS ASSOCIATED THEREWITH

RELATED APPLICATIONS

This application claims the benefit of U.S. Provisional Patent Application No. 62/653,059 filed Apr. 5, 2018, the entire content of which is hereby incorporated by reference herein.

BACKGROUND

Sometimes small branches on a larger limb can catch on a fixed winch as the larger limb is fed into the brush chipper. At other times, a fixed winch is in the way during routine maintenance of a feed table on a brush chipper.

Moveable winches are described in U.S. Pat. No. 7,819,348 to Vermeer Corporation, which discusses a pivoting/telescoping winch boom for a brush chipper and method of using the same. U.S. Pat. No. 7,819,348 is incorporated herein in its entirety.

SUMMARY

The below discussion will provide a concise summary of aspects of the embodiments disclosed herein. Features described in embodiments of aspects may be combined with any other embodiments of the aspects below without departing from the scope hereof unless expressly stated. Furthermore, other features described in the detailed description below, that may not be expressly stated in the embodiments of the aspects in this summary may also be claimed and included in one or more aspects, and embodiments thereof.

In a first aspect, the invention provides a winch boom system including a winch drum attached to a winch shaft such that rotation of the winch shaft about a shaft axis rotates the winch drum, a boom pivotably coupled to the winch shaft for rotation about the shaft axis, and a winch rope wound about the winch drum and extending from the boom at a point distal from the winch drum.

In a second aspect, the invention provides a winch boom system having a frame, a shaft supported by the frame, and a winch drum attached to the shaft such that rotation of the shaft about a shaft axis rotates the winch drum. A boom is pivotably coupled to the frame, the boom defining a cavity in which the winch drum is positioned. A winch rope is wound about the winch drum, passing through the cavity of the boom, and extending from the boom at a point distal from the winch drum.

In a third aspect, the invention provides a self-raising winch boom system including a frame, a shaft supported by the frame, a winch drum attached to the shaft such that rotation of the shaft about a shaft axis rotates the winch drum, a motor coupled to the shaft to selectively drive rotation of the shaft, a boom pivotably coupled to the shaft for rotation about the shaft, the boom defining a cavity in which the winch drum is positioned, and a winch rope wound about the winch drum, passing through the cavity of the boom, and extending from the boom at a point distal from the winch drum. The winch rope is configured to anchor at an anchor location on the boom. The winch rope, the boom, and the winch drum are configured such that tightening of the winch rope when the winch rope is anchored causes the boom to raise between a lowered position and a raised position, and loosening of the winch rope when the winch rope is anchored causes the boom to lower between the raised position and the lowered position.

BRIEF DESCRIPTION OF THE FIGURES

The foregoing and other features and advantages of the disclosure will be apparent from the more particular description of the embodiments, as illustrated in the accompanying drawings, in which like reference characters refer to the same parts throughout the different figures. The drawings are not necessarily to scale, emphasis instead being placed upon illustrating the principles of the disclosure.

FIG. 26 depicts a block diagram illustrating another method for controlling a self-raising winch, such as the winch of FIGS. 1-22, in embodiments.

DETAILED DESCRIPTION

Figure 1:
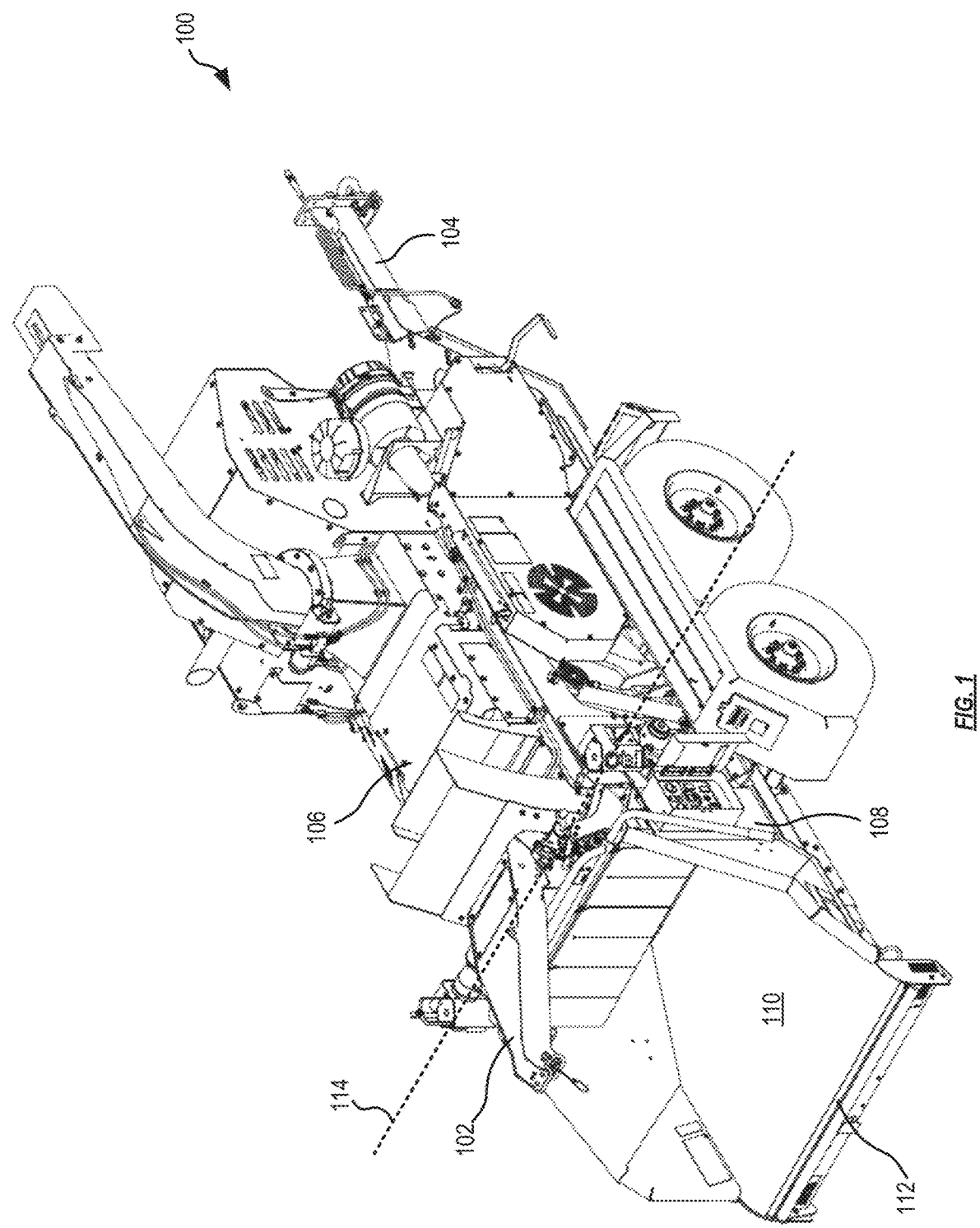
FIG. 1 depicts a front top perspective view of brush chipper machine including a self-raising winch boom, in embodiments.
Figure 2:
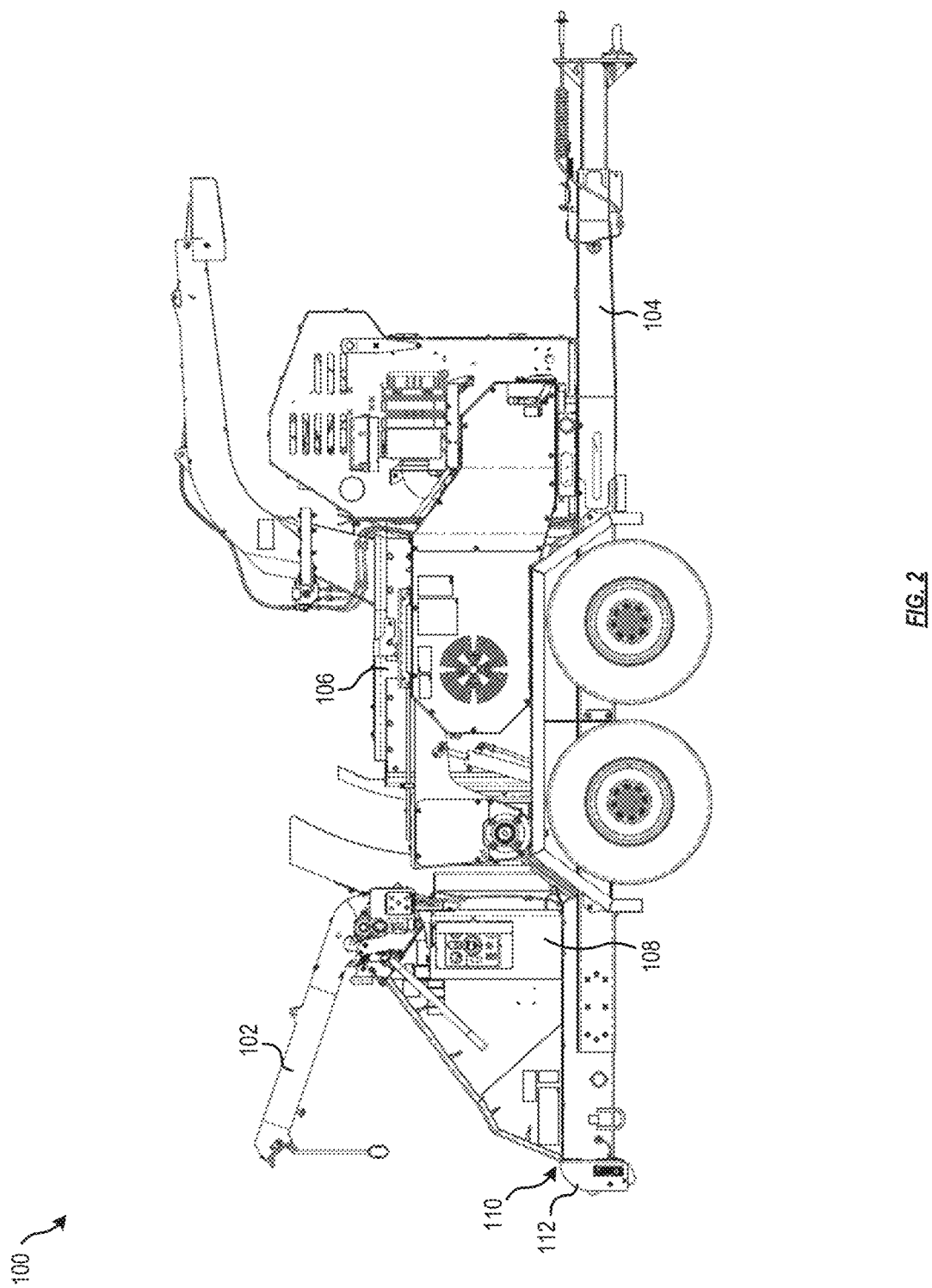
FIG. 2 depicts a right elevation view of the brush chipper machine of FIG. 1.
Figure 3:
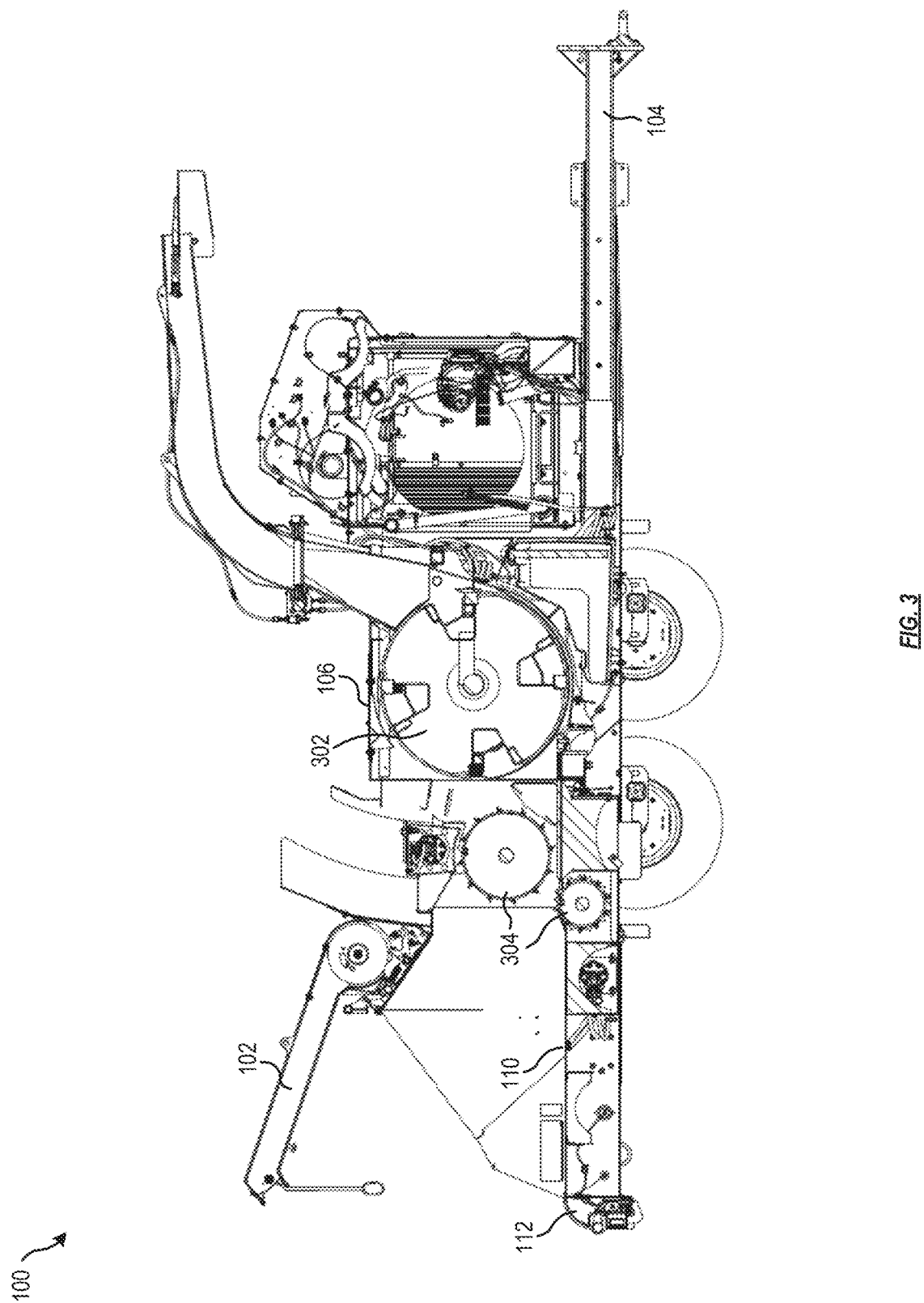
FIG. 3 depicts a cross-sectional view of the brush chipper machine of FIG. 1.

FIG. 1 depicts a front top perspective view of brush chipper machine 100 including a self-raising winch boom 102. FIG. 2 depicts a right elevation view of the brush chipper machine 100 of FIG. 1. FIG. 3 depicts a cross-sectional view of the brush chipper machine 100 of FIG. 1. FIGS. 1-3 are best viewed together with the following description.

The brush chipper machine 100 includes a frame 104 (e.g., a trailer structure), a cutter housing 106 supported on the frame 104 with a cutter mechanism 302 (FIG. 3) positioned within the cutter housing 106. A feed housing 108 is also supported on the frame 104. The feed housing 108 encloses one or more feed mechanism 304 (FIG. 3), such as a feed roller, adapted for feeding material, such as a log, branch, bush, brush, etc., into the cutter mechanism 302. The feed housing 108 is located between the cutter mechanism 302 and a feed table 110 that extends outward from the feed housing 108. The feed table 110 is elevated above ground level and is positioned for supporting the material as the material is fed into the feed mechanism 304. The feed table 110 includes an outer edge 112 located at a position distant or opposite from the feed housing 108.

In FIGS. 1-3, the cutter mechanism 302 is shown as a chipping or cutting drum. However, it will be appreciated that any type of cutting or chipping mechanism (e.g., a disk cutter) could also be used. Also, the feed mechanism 304 shown in FIG. 3 includes two horizontal feed rollers. However, any type of feed mechanism 304 could be used. For example, a single feed roller, vertical feed rollers, belts, or any other type of conveying mechanism could also be used. The feed mechanism 304, in some embodiments, is controlled by a control bar located adjacent to the feed table 110. The brush chipper machine 100 may be constructed generally in accordance with the brush chipper machine described U.S. Pat. No. 7,562,837 to Vermeer Corporation, which is incorporated by reference in its entirety herewith.

The self-raising winch boom 102 is located at the upper edge of the feed housing 108 above the feed table 110, and pivots about an axis 114 between a raised position and a lowered position. It should be appreciated, however, that the details of the self-raising winch boom 102 described herein are not limited solely to brush chipping machines. The self-raising winch boom 102 may be used with any other machine (or component thereof), or in isolation, without departing from the scope hereof. For example, the self-raising winch boom 102 may be used with, but not limited to one or more of a brush chipper or a grinder. Furthermore, if the self-raising winch boom 102 includes a controller for controlling another device, such as via signals from the interlocks 406, 408 described herein, the controller may control any one or more component of the other device, such as a brush chipper feed roller, a brush chipper cutter drum, a grinder a feed roller, a grinder cutter, a feed roller, a cutter drum, and/or a cutter wheel.

Figure 4:
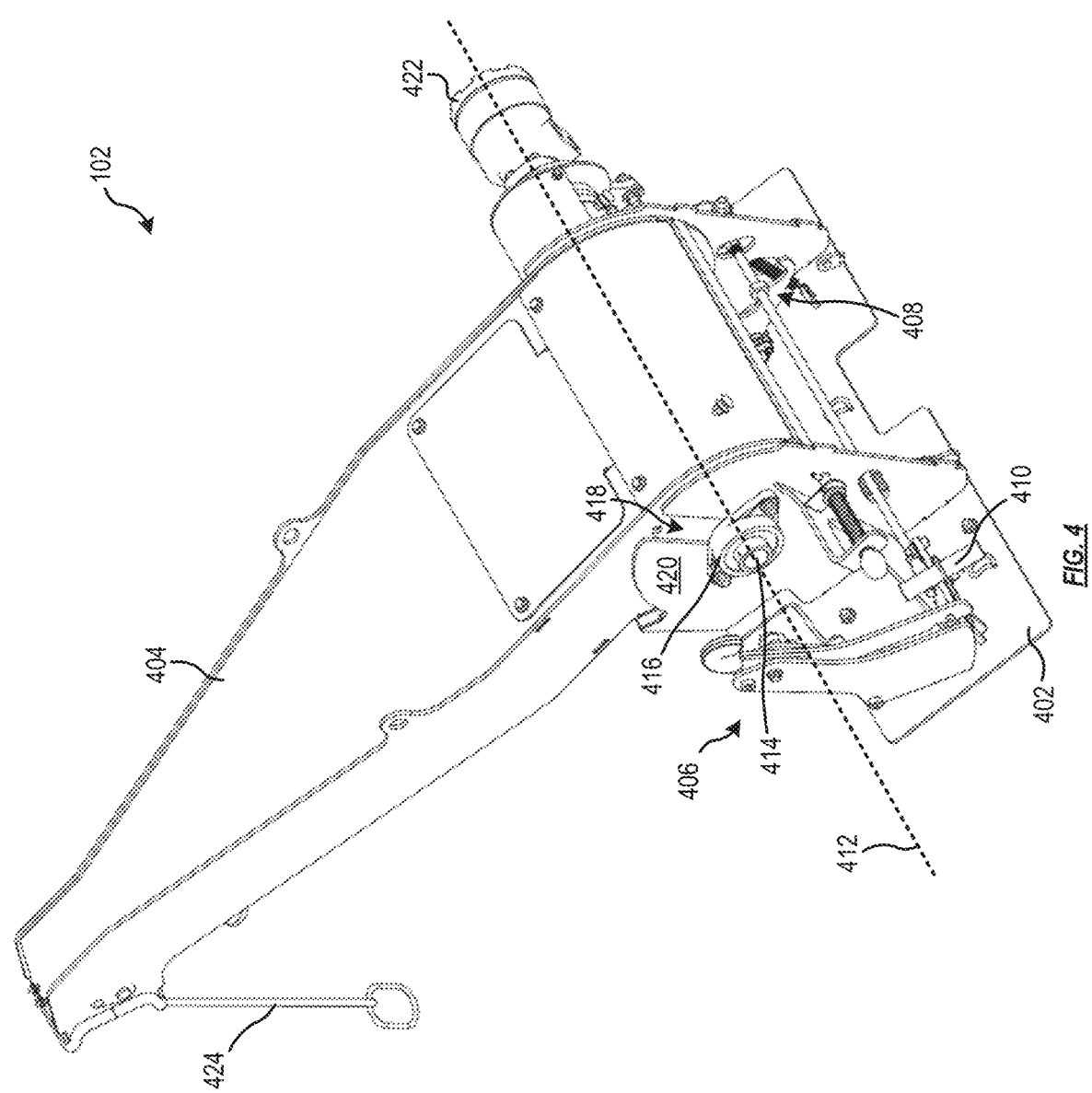
FIG. 4 depicts a rear-top-left perspective view of the self-raising winch of FIG. 1 in isolation and in a lowered position, in embodiments.
Figure 5:
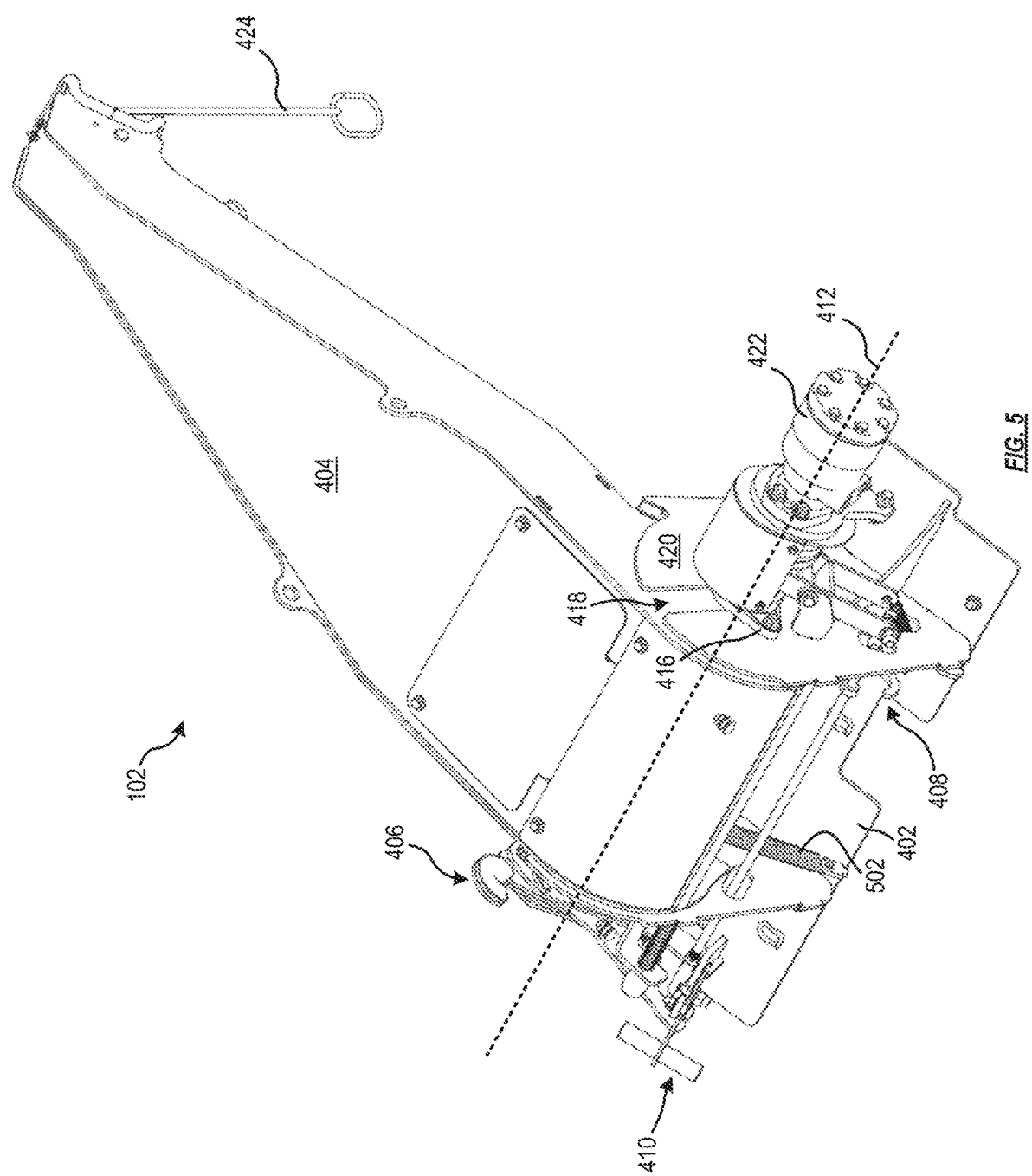
FIG. 5 depicts a rear-top-right perspective view of the self-raising winch of FIG. 1 in isolation and in a lowered position, in embodiments.
Figure 6:
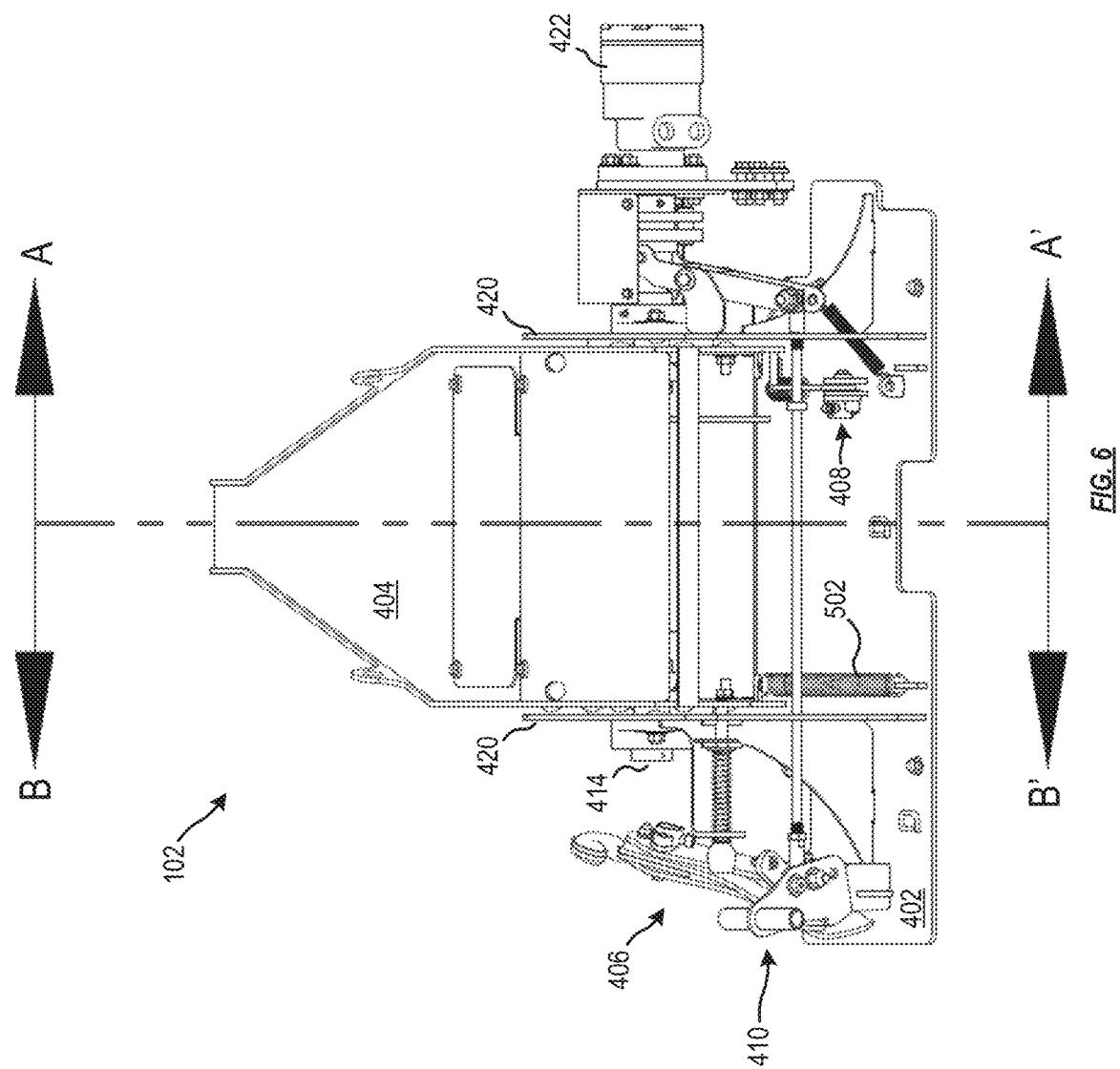
FIG. 6 depicts a rear elevation view of the self-raising winch of FIG. 1 in isolation and in a lowered position, in embodiments.
Figure 7:
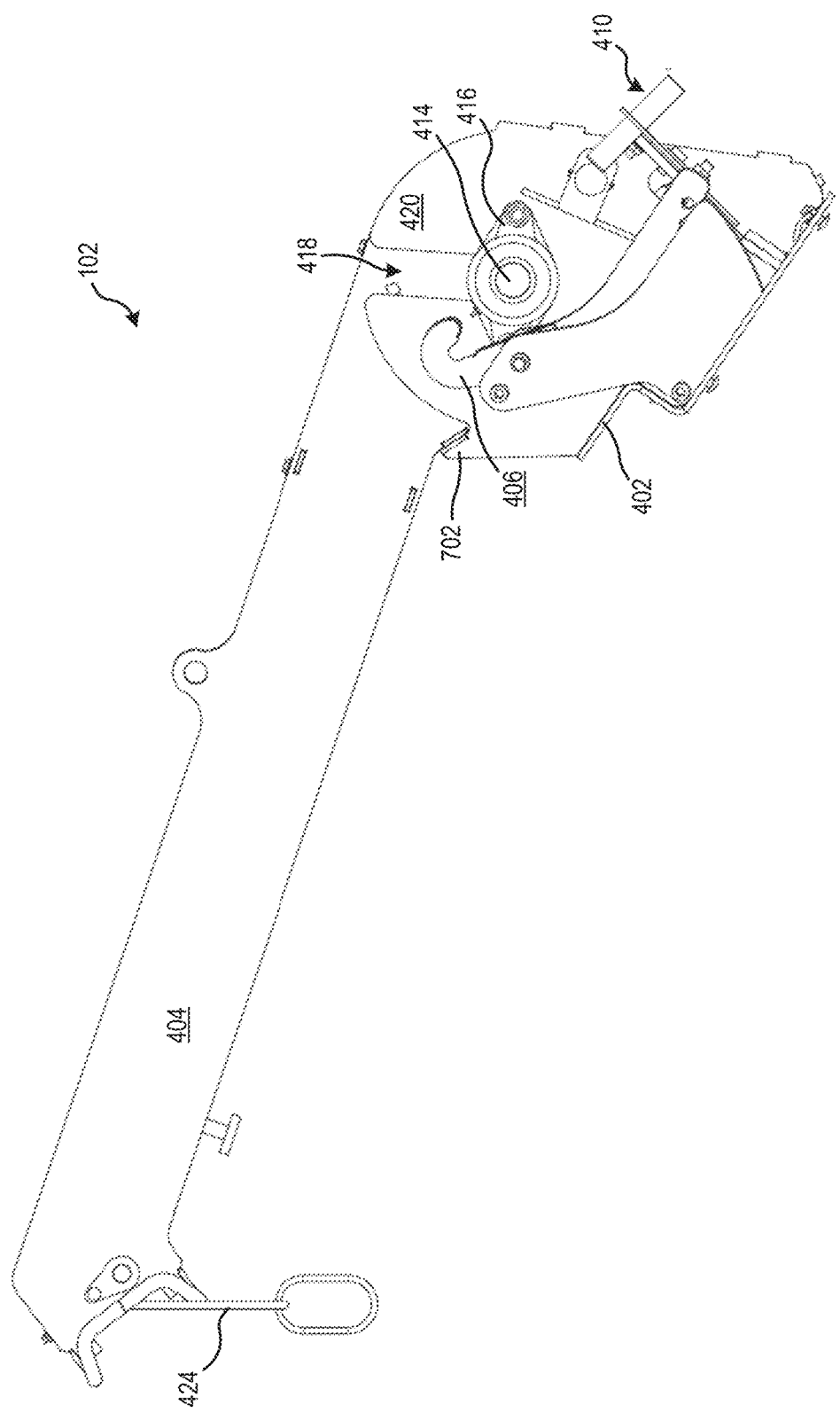
FIG. 7 depicts a left elevation view of the self-raising winch of FIG. 1 in isolation and in a lowered position, in embodiments.
Figure 8:
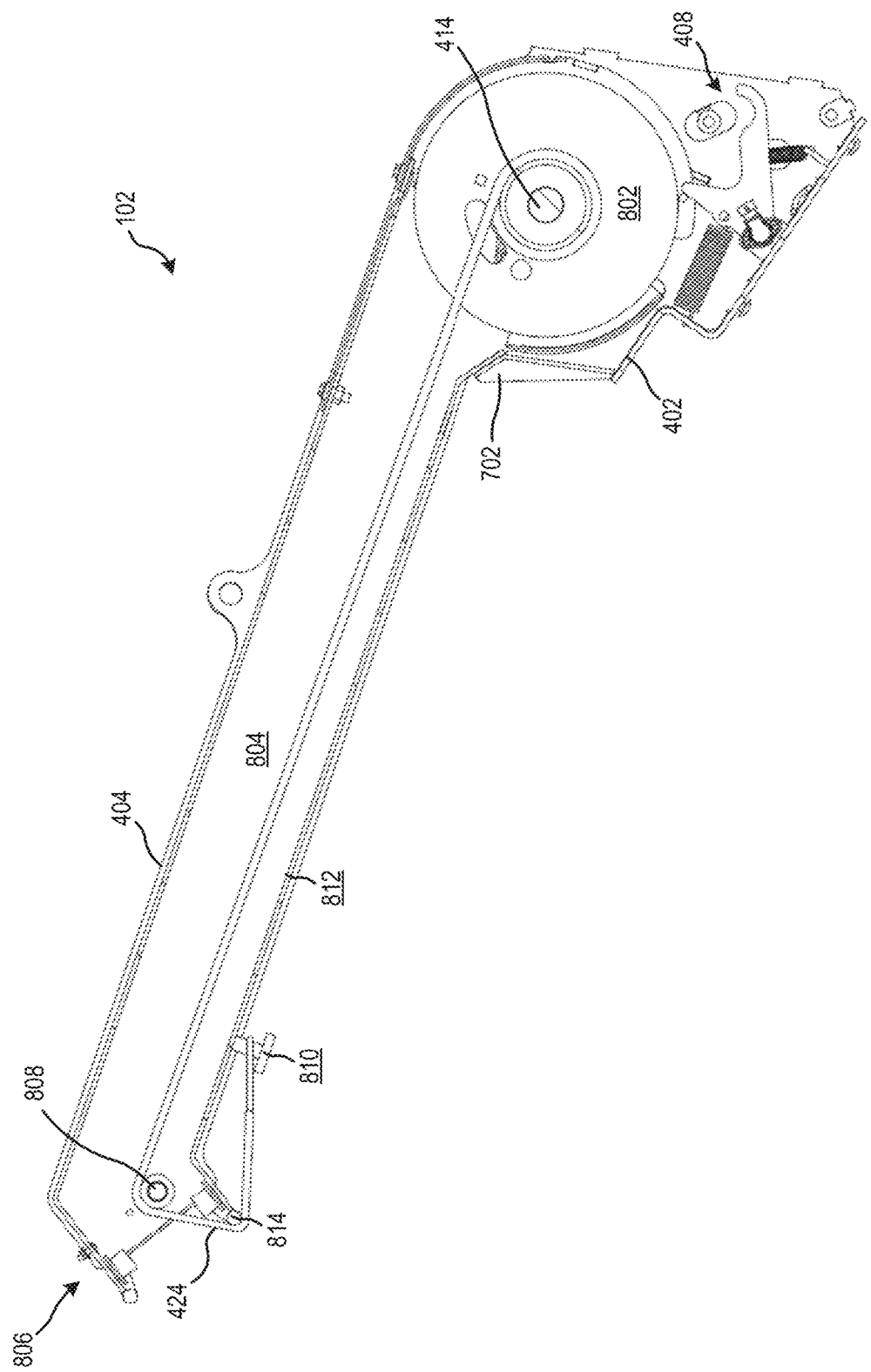
FIG. 8 depicts a cross-sectional view of the self-raising winch of FIG. 1 along section A-A' in FIG. 6, in embodiments.
Figure 9:
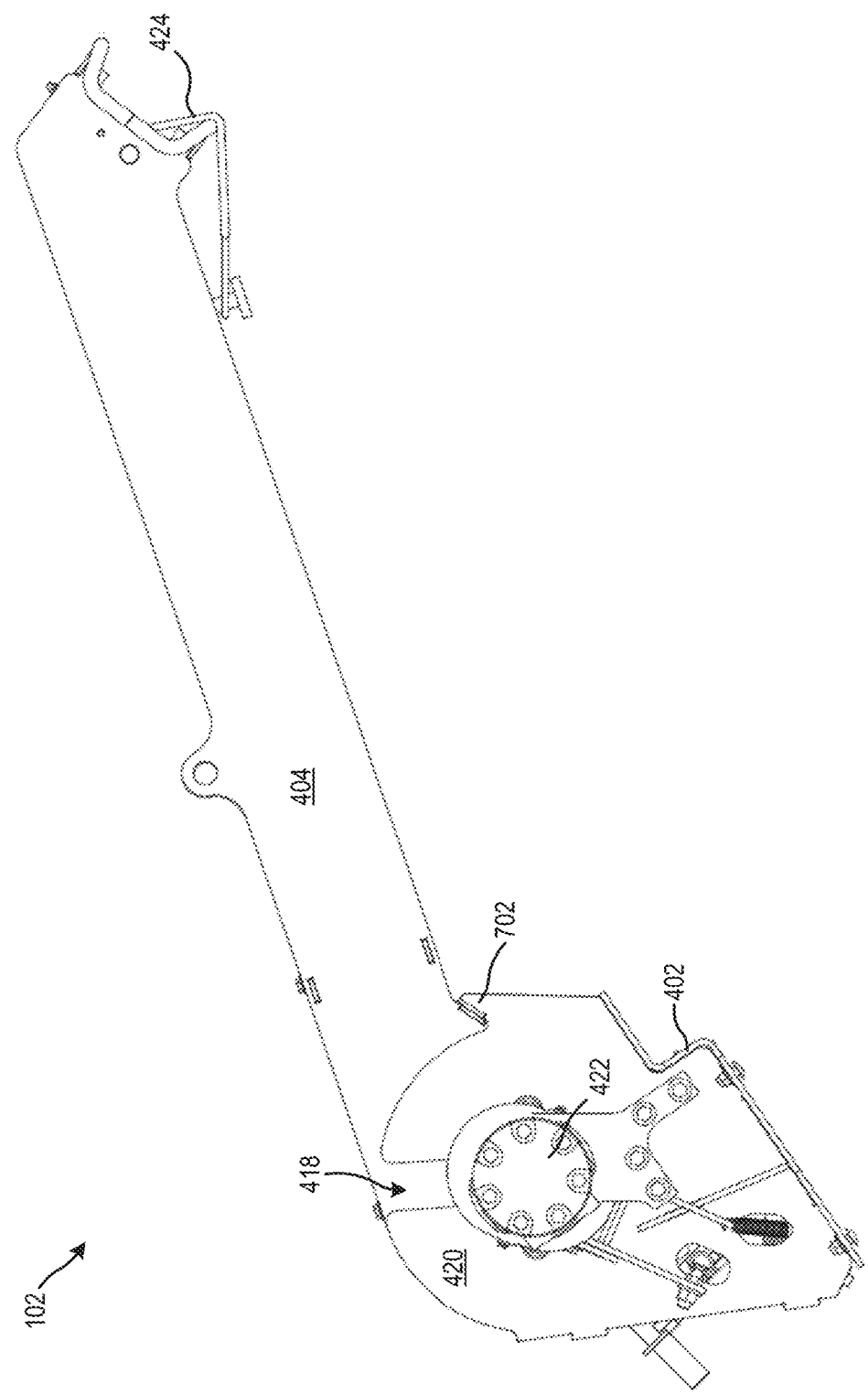
FIG. 9 depicts a right elevation view of the self-raising winch of FIG. 1 in isolation and in a lowered position, in embodiments.
Figure 10:
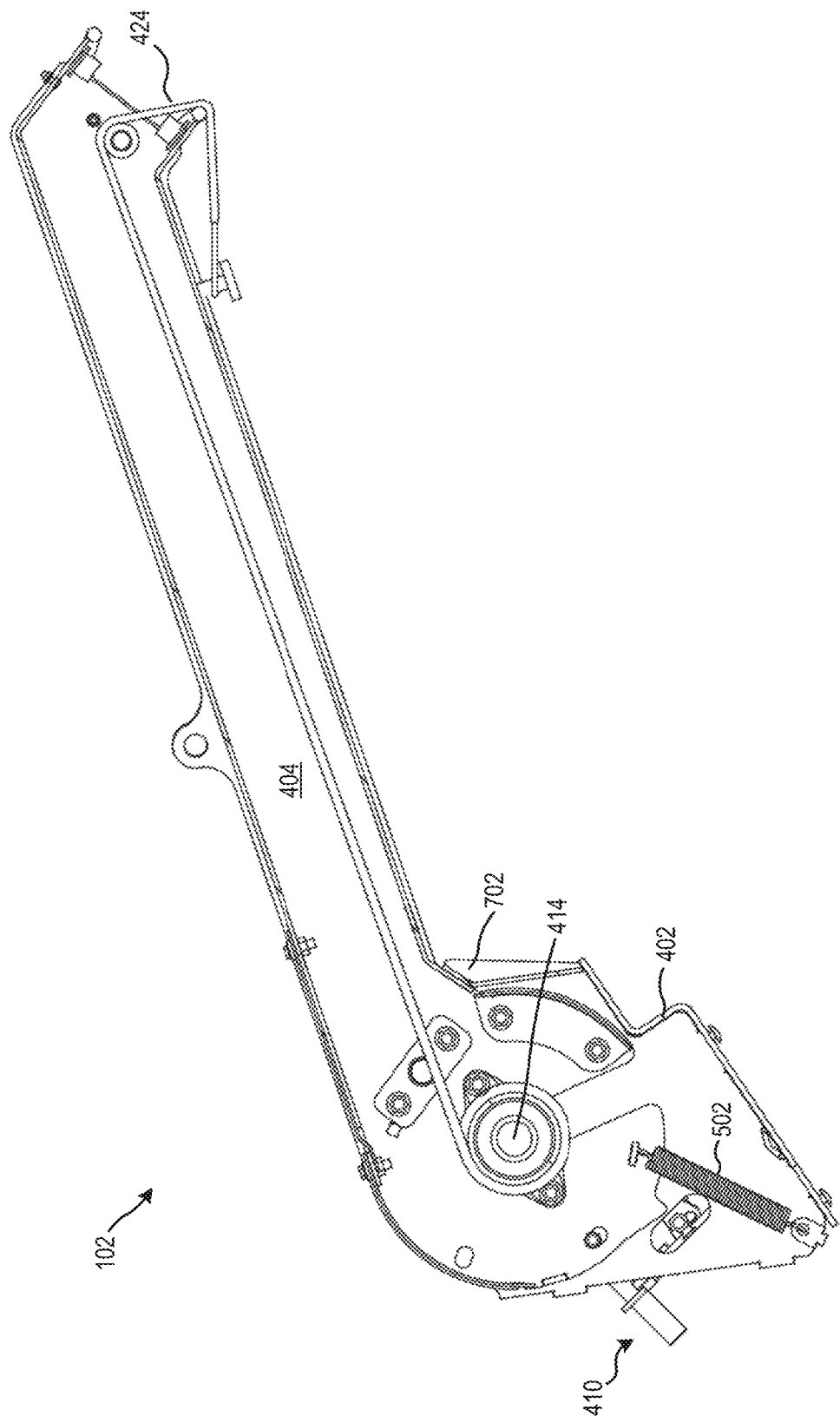
FIG. 10 depicts a cross-sectional view of the self-raising winch of FIG. 1 along section B-B' in FIG. 6, in embodiments.
Figure 11:
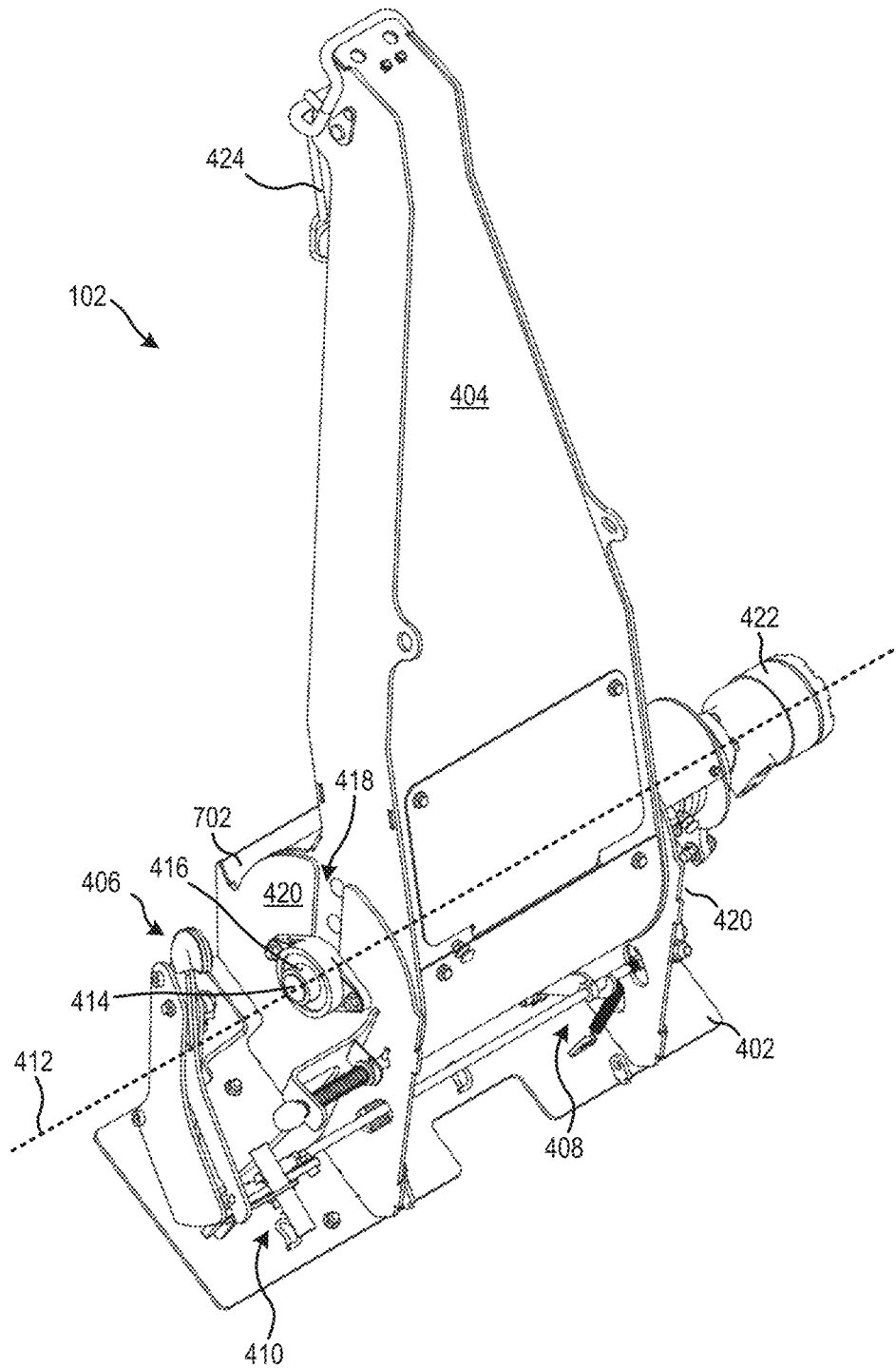
FIG. 11 depicts a rear-top-left perspective view of the self-raising winch of FIG. 1 in isolation and in a raised position, in embodiments.
Figure 12:
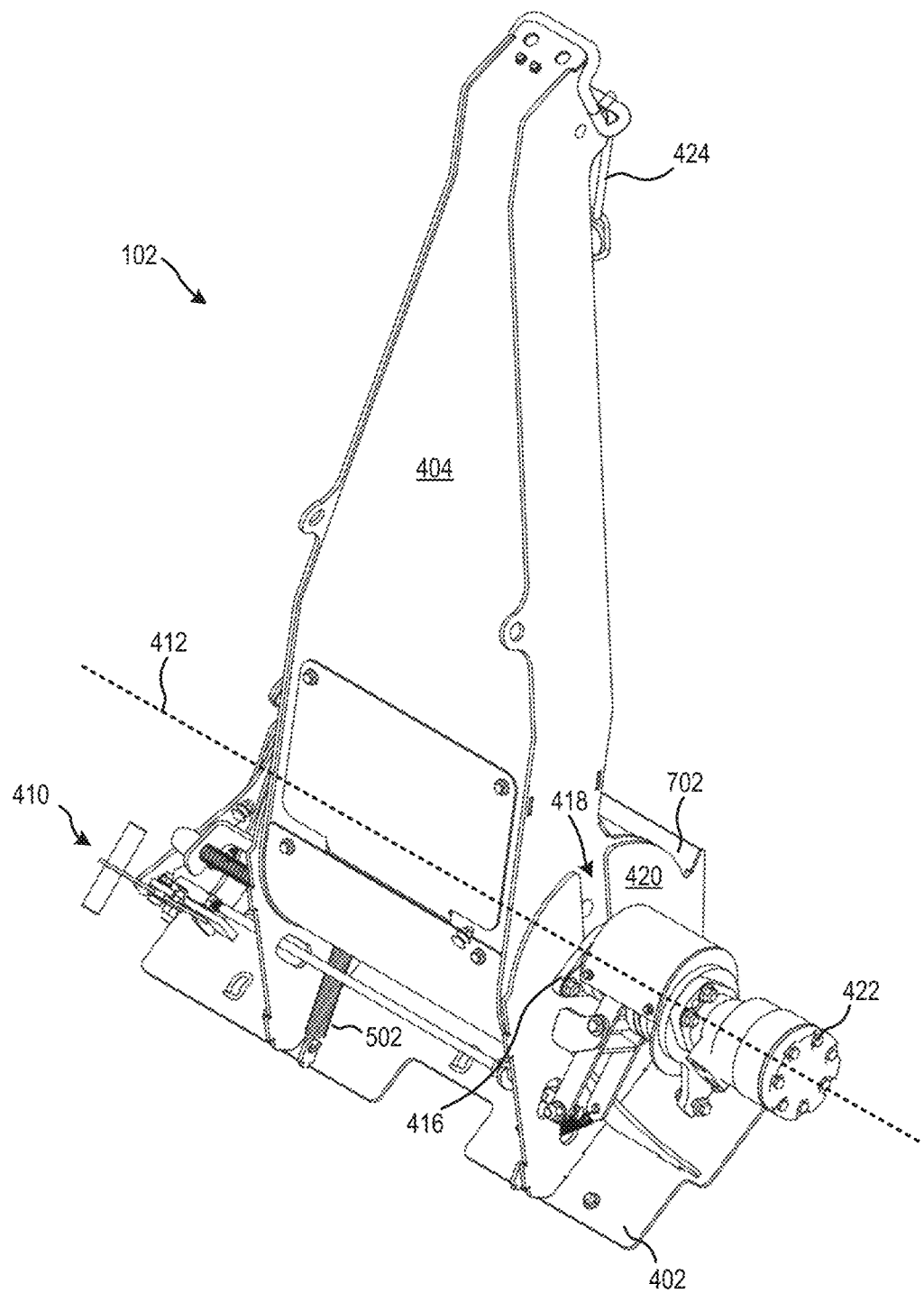
FIG. 12 depicts a rear-top-right perspective view of the self-raising winch of FIG. 1 in isolation and in a raised position, in embodiments.
Figure 13:
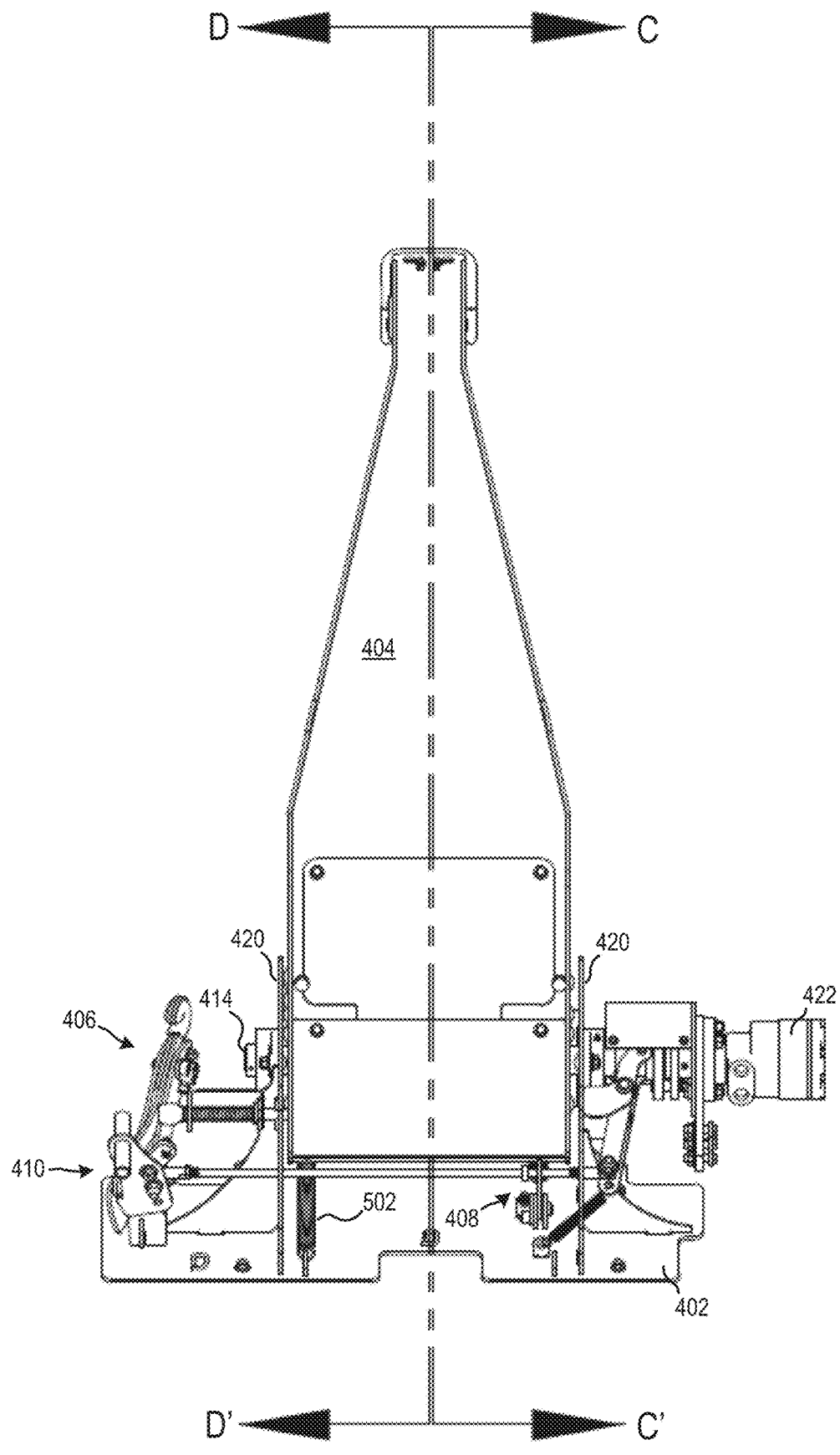
FIG. 13 depicts a rear elevation view of the self-raising winch of FIG. 1 in isolation and in a raised position, in embodiments.
Figure 14:
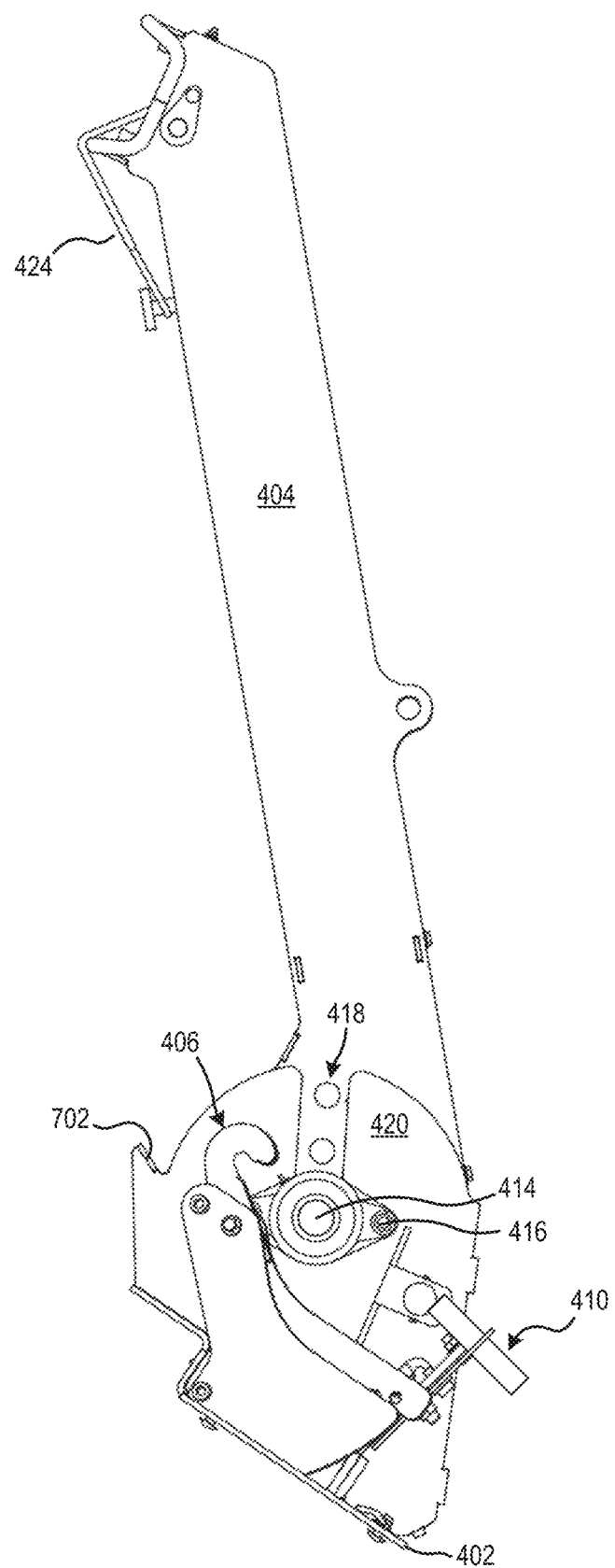
FIG. 14 depicts a left elevation view of the self-raising winch of FIG. 1 in isolation and in a raised position, in embodiments.
Figure 15:
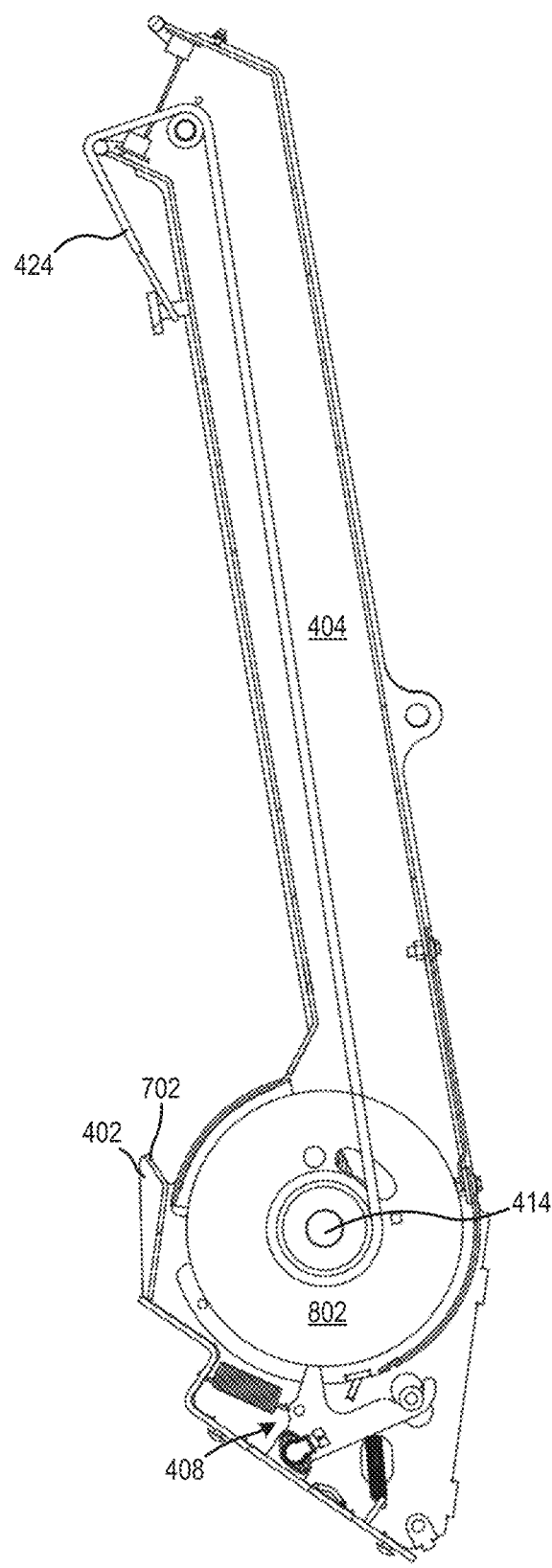
FIG. 15 depicts a cross-sectional view of the self-raising winch of FIG. 1 along section C-C' in FIG. 13, in embodiments.
Figure 16:
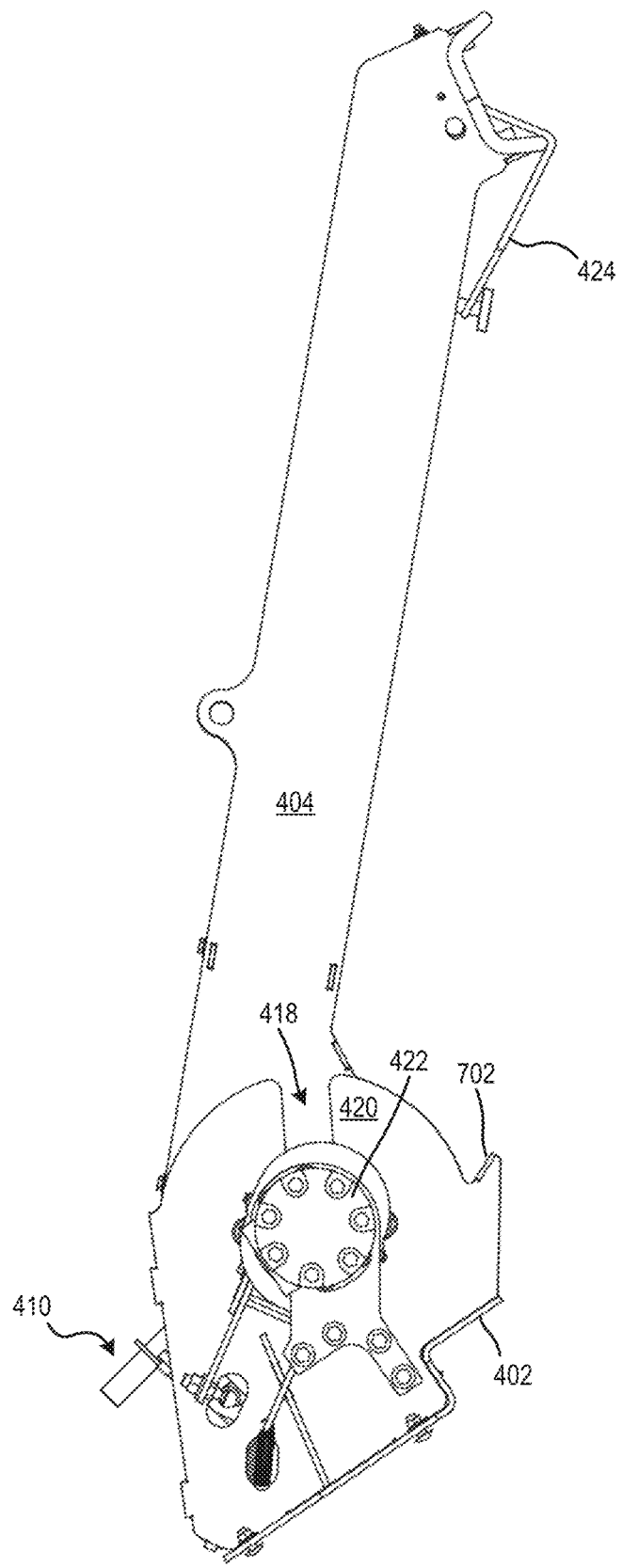
FIG. 16 depicts a right elevation view of the self-raising winch of FIG. 1 in isolation and in a raised position, in embodiments.
Figure 17:
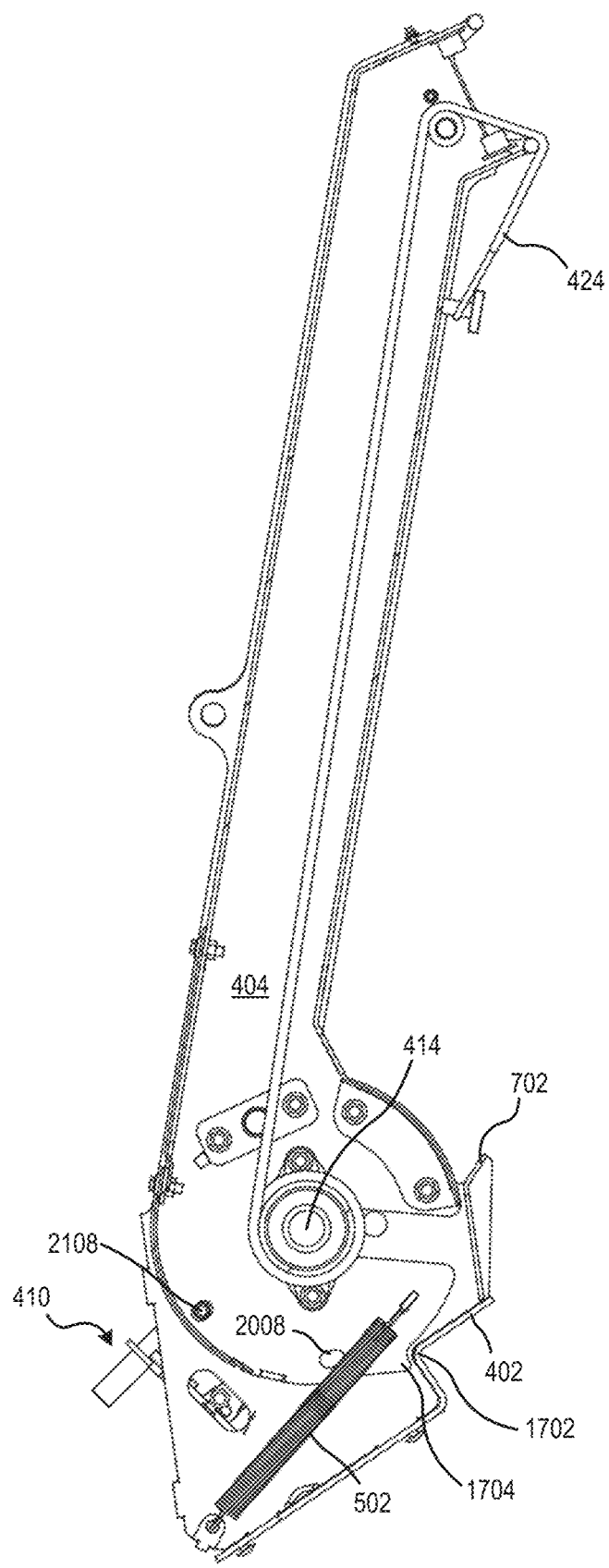
FIG. 17 depicts a cross-sectional view of the self-raising winch of FIG. 1 along section D-D' in FIG. 13, in embodiments.

FIG. 4 depicts a rear-top-left perspective view of the self-raising winch boom 102 of FIG. 1 in isolation and in a lowered position. FIG. 5 depicts a rear-top-right perspective view of the self-raising winch boom 102 of FIG. 1 in isolation and in a lowered position. FIG. 6 depicts a rear elevation view of the self-raising winch boom 102 of FIG. 1 in isolation and in a lowered position. FIG. 7 depicts a left elevation view of the self-raising winch boom 102 of FIG. 1 in isolation and in a lowered position. FIG. 8 depicts a cross-sectional view of the self-raising winch boom 102 of FIG. 1 along section A-A' in FIG. 6. FIG. 9 depicts a right elevation view of the self-raising winch boom 102 of FIG. 1 in isolation and in a lowered position. FIG. 10 depicts a cross-sectional view of the self-raising winch boom 102 of FIG. 1 along section B-B' in FIG. 6. FIG. 11 depicts a rear-top-left perspective view of the self-raising winch boom 102 of FIG. 1 in isolation and in a raised position. FIG. 12 depicts a rear-top-right perspective view of the self-raising winch boom 102 of FIG. 1 in isolation and in a raised position. FIG. 13 depicts a rear elevation view of the self-raising winch boom 102 of FIG. 1 in isolation and in a raised position. FIG. 14 depicts a left elevation view of the self-raising winch boom 102 of FIG. 1 in isolation and in a raised position. FIG. 15 depicts a cross-sectional view of the self-raising winch boom 102 of FIG. 1 along section C-C' in FIG. 13. FIG. 16 depicts a right elevation view of the self-raising winch boom 102 of FIG. 1 in isolation and in a raised position. FIG. 17 depicts a cross-sectional view of the self-raising winch boom 102 of FIG. 1 along section D-D' in FIG. 13. FIGS. 4-17 are best viewed together with the following description.

The self-raising winch boom 102 includes a frame 402, a boom 404, and one or more of a rope stowage interlock system 406, a boom-position interlock system 408, and a freewheel system 410.

The frame 402 couples with the feed housing 108 (or with another structure in embodiments where the self-raising winch boom 102 is not used in conjunction with the brush chipping machine 100). The frame 402 may include a lower stop 702 (FIG. 7) that the boom 404 rests upon when the boom 404 is in the lowered position (FIGS. 4-10). In addition, the frame 402 may have an upper stop 1702 (FIG. 17) that a protrusion 1704 of the boom 404 abuts when the boom 404 is in the raised position (FIGS. 11-17).

Figure 18:
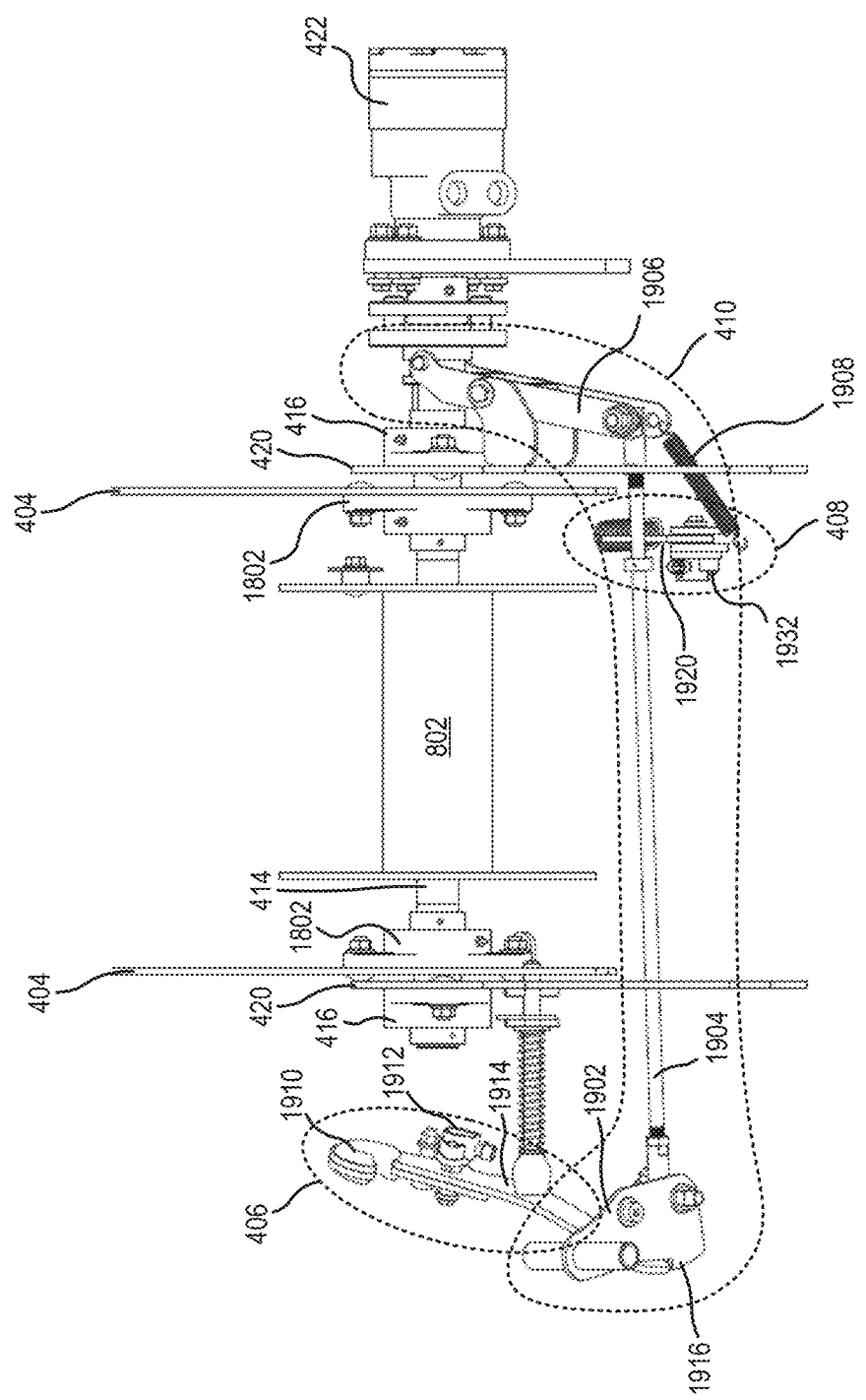
FIG. 18 depicts details of the rope stowage interlock system, the boom-position interlock system, and the freewheel system of the self-raising winch boom system of FIG. 1 in isolation, in embodiments.

The boom 404 is rotatably supported by the frame 402 and pivots about a shaft 414 oriented on axis 412 (shown only in FIGS. 4-5 and 11-12 for clarity) between the lowered position and the raised position. Axis 412 may be the same as axis 114 of FIG. 1. The shaft 414 may be supported by the frame 402 via one or more bearings 416. The boom 404 may be rotatably coupled to the shaft 414 via one or more boom-support bearings 1802 (shown in FIG. 18). FIG. 18 depicts a cutaway view for clarity of the bearing 416 coupling the shaft 414 to the pedestal 420 of frame 402, and the boom-support bearing 1802 coupling the boom 404 to the shaft 414. To position the boom 404 with respect to the frame 402, the boom 404 may be coupled to the shaft 414 via boom-support bearings 1802. Then, the shaft 414 may be inserted into a notch 418 within one or more pedestals 420 of the frame 402. Then, the bearing 416 (and thus the shaft 414) may be secured to the frame 402. There may be one or two (or more) bearings 416, and boom-support bearings 1802 without departing from the scope hereof.

A winch drum 802 (FIG. 8) is fixedly mounted to the shaft 414 within a cavity of the boom 404. The shaft 414 is coupled to a motor 422 (via a coupler, clutch, disengaging mechanism, etc.) and rotated by the motor 422 (that is coupled to the frame 402) when the clutch or disengaging mechanism is engaged. The winch drum 802 and shaft 414 may also rotate manually when the clutch or disengaging mechanism is disengaged (thereby disengaging the shaft 414 from the motor 422), such as via the freewheel system 410. When the shaft 414 rotates, the winch drum 802 also rotates thereby extending or retracting a winch rope 424. Referring to FIG. 8, the winch rope 424 extends through a cavity 804 within the boom 404 and exits the cavity 804 at a distal end 806 of the boom 404 from the shaft 414. A first guide 808 may be located proximate the distal end 806, within the cavity 804, to aid the path of the winch rope 424. The winch rope 424 may be routed through the cavity 804 and wind around the winch drum 802. In the illustrated embodiment, the winch rope 424 is routed about the top of the winch drum 802.

The winch rope 424 may attach at an anchor location such that when the shaft 414 is rotated (via motor 422) to retract the winch rope 424, tension is caused in the winch rope 424 thereby raising the boom 404, and vice versa. In embodiments, the anchor location may be a winch rope anchor 810 that may be located at a bottom edge 812 of the boom 404. In the embodiments shown herein, the winch rope 424 is in a "ready-to-use" state in FIGS. 1-7, in a "ready-to-lift" state in FIGS. 8-10, and "raised" state in FIGS. 11-16. It should be appreciated that the winch rope anchor 810 may be located in another anchor location, such as on an edge 814 of the boom 404. Alternatively, the anchor location may be at a point along the axis of rotation of the boom 404 (e.g., axis 412) such that the winch rope 424 has substantially equal lengths between the winch drum and a boom tip, and the anchor location and the boom tip. Because the boom 404 is rotatably attached to the shaft 414 and frame 402, this tension will cause the winch boom 404 to rise from the lowered position. Similarly, as the winch rope 424 is released, the tension in the winch rope 424 is reduced and thus the boom 404 lowers from the raised position to the lowered position until the boom 404 reaches the lower stop 702. In embodiments, a spring 502 may be coupled with the boom 404 to assist in pulling the boom 404 down.

Figure 19:
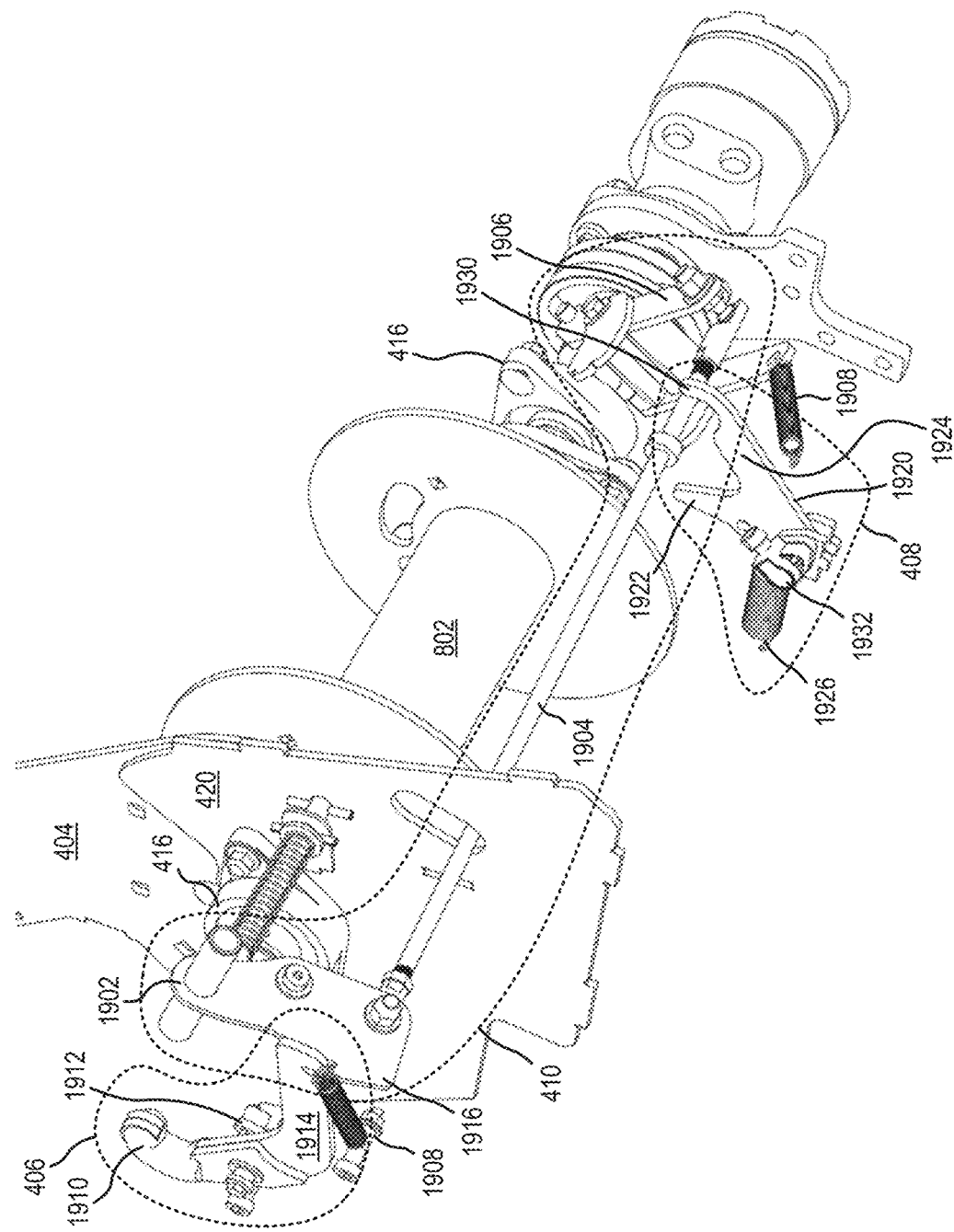
FIG. 19 depicts a perspective view of the rope stowage interlock system, the boom-position interlock system, and the freewheel system of the self-raising winch boom system of FIG. 1 in isolation, in embodiments.

FIG. 18 depicts of the rope stowage interlock system 406, the boom-position interlock system 408, and the freewheel system 410 in isolation. FIG. 19 depicts a perspective view of the rope stowage interlock system 406, the boom-position interlock system 408, and the freewheel system 410 in isolation. In FIGS. 18 and 19, the boom 404 and the frame 402 are removed for clarity of illustration. Particularly when the self-raising winch boom 102 is used in conjunction with the brush chipping machine 100, it is important that the winch rope 424 does not get fed into the brush chipping machine 100. Therefore, one or more of the rope stowage interlock system 406, the boom-position interlock system 408, and the freewheel system 410 may be included as safety features.

The freewheel system 410 includes handle 1902 coupled to a rod 1904 that is coupled to a linkage 1906 that controls a clutch associated with the motor 422 and shaft 414. The user, by pushing on the handle 1902 towards the motor 422 (or pulling on the handle 1902, depending on where the rod 1904 is coupled to the rotation point of the handle 1902), causes the rod 1904 to rotate the linkage 1906 thereby disengaging the clutch such that the shaft 414 may rotate freely. When disengaged, an operator may pull on the winch rope 424 (not shown in FIGS. 18-19) and the winch drum 802 will rotate thereby releasing length of the winch rope 424. In embodiments, one or more springs 1908 may be included to assist in pushing or pulling the handle 1902, or maintaining the freewheel system 410 clutch in an engaged state. The spring 1908 may be coupled with the linkage 1906, or the handle 1902, and the frame 402 (not shown in FIGS. 18-19). When the clutch is engaged, the winch motor 422 and associated control may be used to retract or release the winch rope 424.

In embodiments including the freewheel system 410, it may be important that the freewheel system 410 is not activated when (1) the boom 404 is in the raised position, and/or (2) the winch rope 424 is engaging the rope stowage interlock system 406. Therefore, as discussed below, the rope stowage interlock 406 and the boom-position interlock 408, if included, may interact with the freewheel system 410 to prevent action of the freewheel system 410.

One embodiment of the rope stowage interlock system 406 includes a rope stowage hook 1910 located on the exterior of the frame 402, such as adjacent the boom 404, or on some portion of the machine 100. As such, the rope stowage interlock system 406 may be similar to, and include any of the features of, the interlock system described in detail in U.S. Pat. No. 7,562,837 to Vermeer Corporation, which is incorporated by reference in its entirety herewith. The rope stowage interlock system 406 is engaged when the winch rope 424 is attached to the hook 1910. Once the winch rope 424 is attached to the hook 1910, and sufficient tension is put on the hook 1910, a hook interlock sensor 1912 (such as a rotary potentiometer, a proximity sensor, etc.) sends a winch rope stowage signal to a controller (discussed further below). In response, the controller may allow operation of the feed mechanism 304. Otherwise, the feed mechanism 304 is not operational (unless another condition is found, such as the winch boom 404 is raised as discussed below) and thus the winch rope 424 cannot be fed into the brush chipping machine 100. Furthermore, a linkage arm 1914 may interface with a tab 1916 on the freewheel handle 1902. If the winch rope 424 is attached to the hook 1910, the hook 1910 is stationary because of the tension in the winch rope 424. Therefore, the linkage arm 1914 abuts the tab 1916 and prevents movement of the handle 1902. The linkage arm 1914 may be below the tab 1916 without departing from the scope hereof if that location prevents movement of the handle 1902 when the winch rope 424 is engaging the hook 1910.

Figure 20:
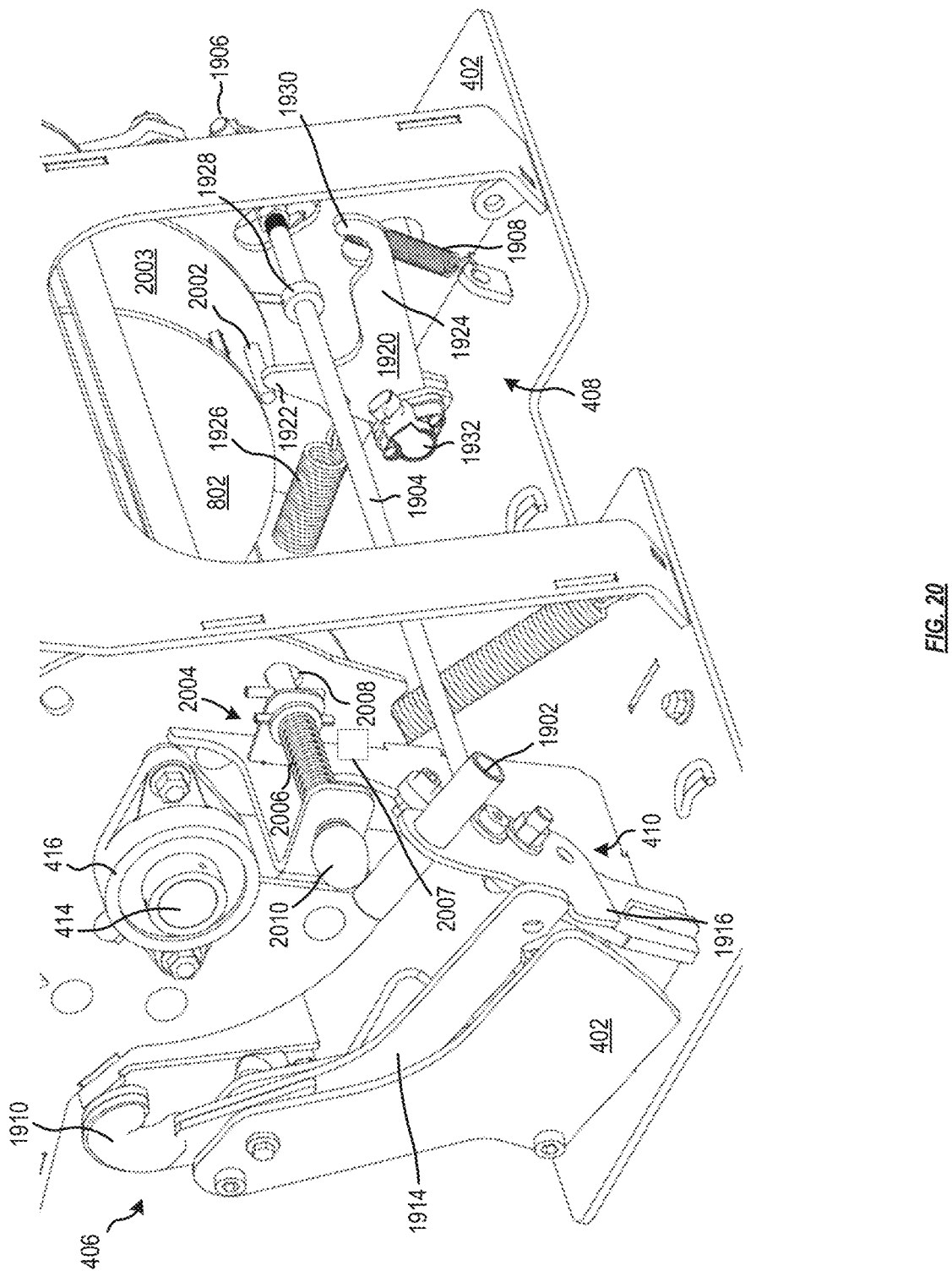
FIG. 20 depicts a view of the plate of the boom-position interlock system of the self-raising winch boom system of FIG. 1, when the boom is in a lowered position.
Figure 21:
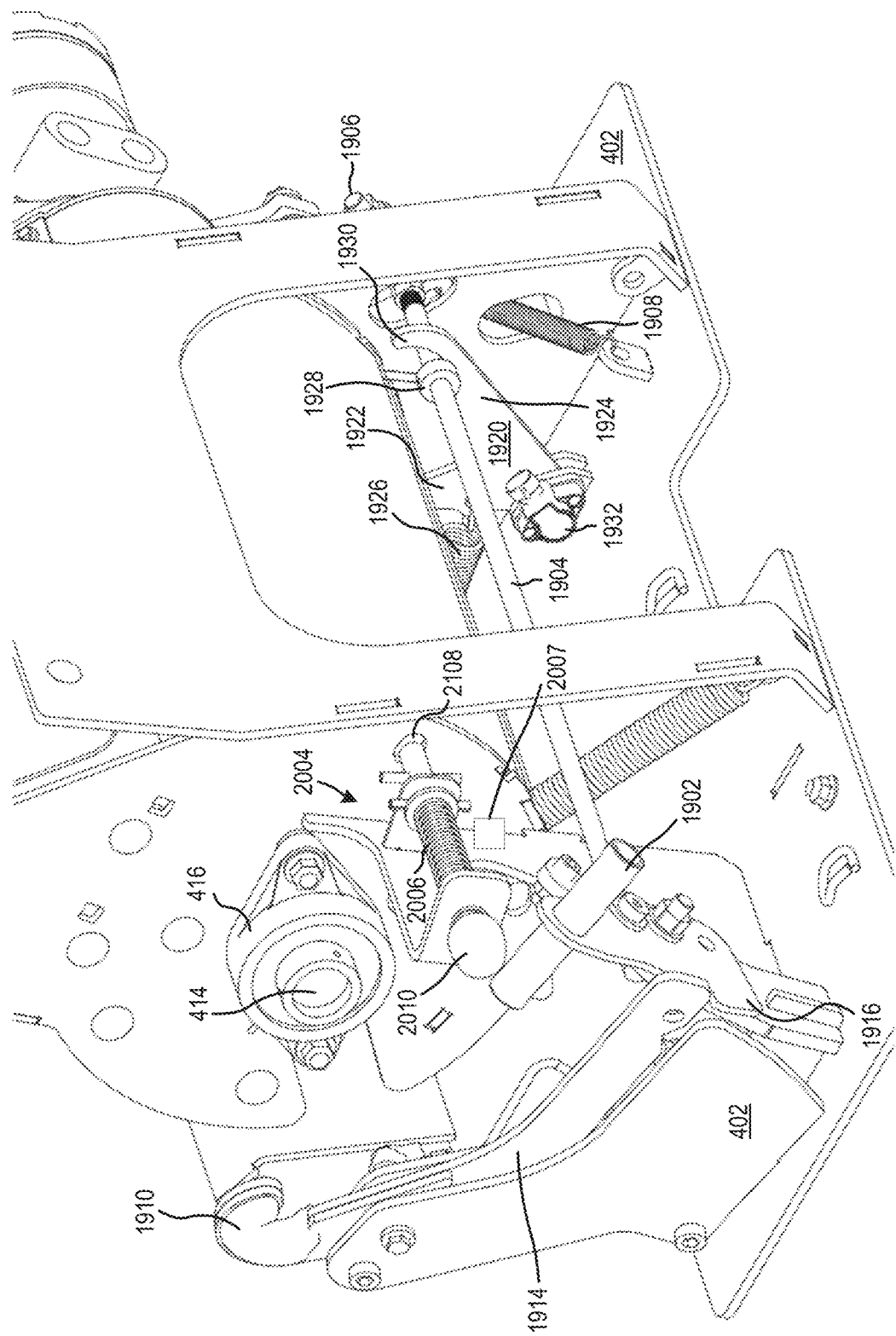
FIG. 21 depicts a view of the plate of the self-raising winch boom system of FIG. 1, when the boom is in a raised position.

One embodiment of the boom-position interlock system 408 includes a plate 1920. FIG. 20 depicts a view of plate 1920 when the boom 404 is in a lowered position. FIG. 21 depicts a view of the plate 1920 when the boom is in a raised position. FIGS. 18-21 are best viewed together with the following description of the boom-position interlock system 408. The plate 1920 includes a first arm 1922 and a second arm 1924. In the embodiment shown in FIGS. 18-21, the plate 1920 pivots at the vertex of the first and second arms 1922, 1924. A spring 1926 biases the plate 1920 in a first direction. When the boom 404 is raised or lowered, a pin 2002 (FIG. 20) located on the boom frame 2003 counteracts the spring 1926 thereby causing the plate 1920 to rotate in a second direction opposing the first direction.

In the embodiment shown in FIGS. 18-21, when the boom 404 is in the raised position (shown in FIG. 21), the plate 1920 is biased by the spring 1926 in the first direction, and the second arm 1924 abuts the rod 1904. The rod 1904 is shown with a collar 1928, and the second arm 1924 is shown with a hook 1930. The hook 1930 and collar 1928 prevents movement (e.g. pushing) of the handle 1902 such that the freewheel system 410 cannot be operated when the boom is in the raised position. When the boom is in the lowered position (FIG. 20), the pin 2002 interacts with (e.g. pushes against) the first arm 1922 and counteracts the force of spring 1926 such that the plate 1920 is rotated in the second direction. This also removes the hook 1930 from the rod 1904 allowing the collar 1928 to move laterally along the axis of the rod 1904 when the handle 1902 is pushed. As such, the freewheel system 410 is operational when the boom is in the lowered position (and the rope stowage interlock 406 is not preventing operation of the freewheel system 410 as discussed above).

Furthermore, a sensor 1932 (such as a rotary potentiometer; a proximity sensor, etc.) may be coupled with the plate 1920 to detect position thereof. The sensor 1932 may send a signal to a controller (discussed further below). In response, the controller may allow operation of the feed mechanism 304 when the boom-position signal from the sensor 1932 indicates that the boom 404 is in the raised position. Otherwise, the feed mechanism 304 is not operational and thus the winch rope 424 is prevented from being fed into the brush chipping machine 100. The raised position may be determined when the sensor produces a boom-position signal above or below a predetermined threshold (for a rotary potentiometer). This predetermined threshold may be independent on the point at which the hook 1930 interacts with the collar 1928. For example, the hook 1930 may engage the rod 1904 until the boom 404 is within first boom-position threshold (e.g. 15 degrees (or some other value) of the lower stop 702), but the sensor 1932 may not indicate that the boom 404 is in the lowered position until the boom 404 is within a second boom-position threshold (e.g., within 5 degrees (or some other value) of the lower stop 702). The first boom-position threshold may be less than, equal to, or greater than the second boom-position threshold. Furthermore, the sensor 1932 may have position thresholds for both the lowered and raised positions, such that the sensor 1932 (or a boom-position signal generated thereby) may be used to determine when the boom is neither in the raised nor the lowered position. The raised and lowered positions may also be detected via sensors in addition to or alternate of sensor 1932, such as pressure sensors that the boom 404 contacts when the boom 404 is in a given position, or proximity sensors that detect (e.g., optically) when the boom 404 is in a given position.

FIGS. 20-21 also show an optional boom lock system 2004. The boom lock system 2004 includes a spring biased pin 2006 that inserts into a lowered-position locking aperture 2008 on the boom frame when the boom 404 is in the lowered position and/or a raised-position locking aperture 2108 when the boom 404 is in the raised position. The locking apertures 2008 and 2108 are also clearly shown in FIG. 17. In order to lower or raise the boom 404, an operator may be required to pull on a knob 2010 and retract the pin 2006 from the aperture 2008 or 2108 thereby unlocking the position of the boom 404.

The pin 2006 can operate with a sensor 2007 (e.g., a limit switch or proximity sensor) that detects whether the pin 2006 is retracted, and therefore not positioned in either locking aperture 2008, 2108, or extended, and therefore positioned in one of the locking apertures 2008, 2108. The sensor 2007 can detect the position of the pin 2006 itself, the position of features supported on the pin 2006 (e.g., a washer or a spring), or the position of the knob 2010. This locking pin sensor 2007 can communicate with the controller and the winch motor to restrict operation of the winch motor (e.g., allow no operation or only slowed operation of the winch motor) when the locking pin 2006 is not positioned in either locking aperture 2008, 2108. In this regard, when the boom 404 is not locked, the system recognizes the instability of the unlocked boom 404 such that appropriate restrictions are placed on winch operation.

Figure 22:
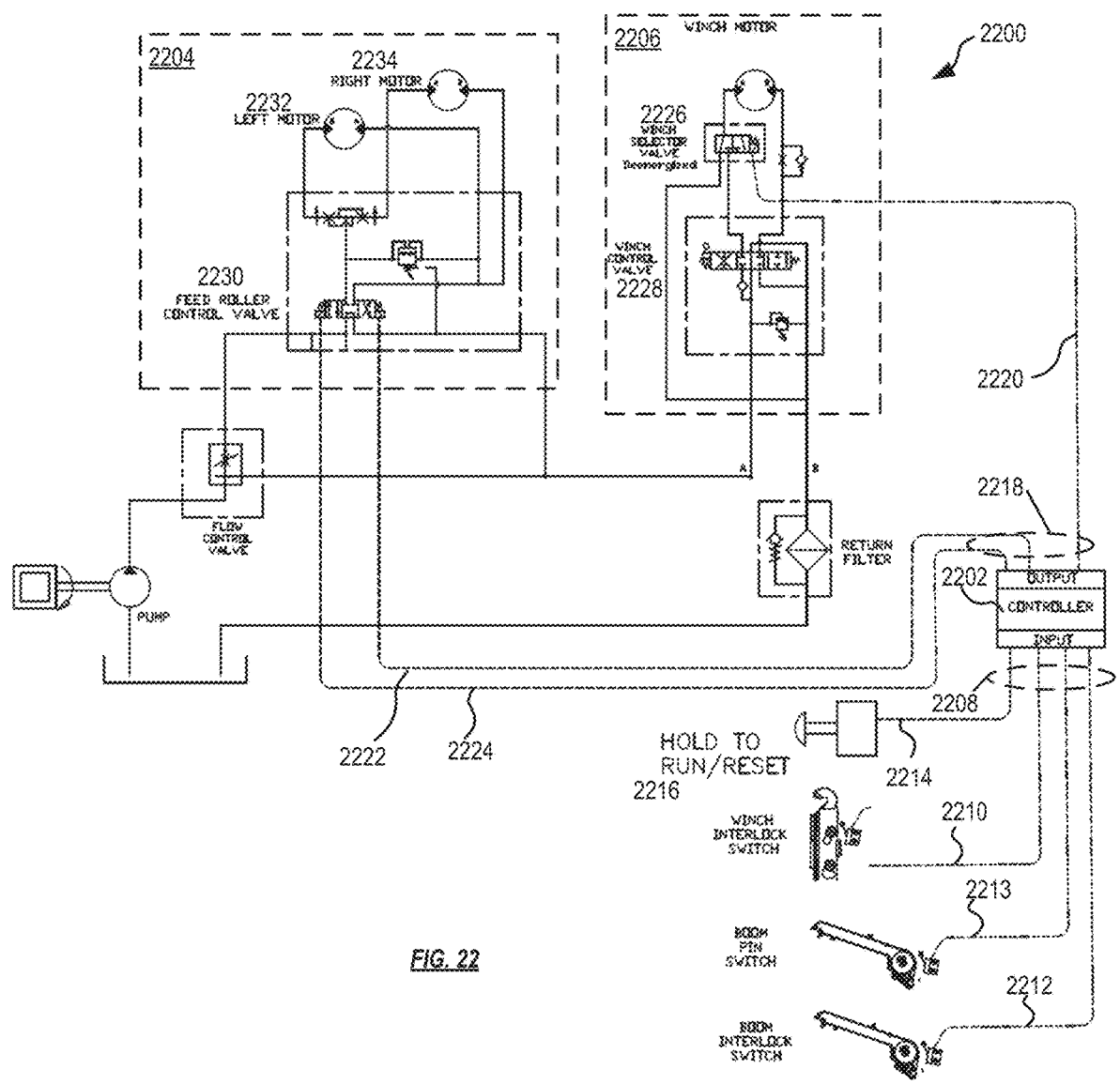
FIG. 22 depicts a schematic view of a control system for the self-raising winch boom brush chipper machine discussed in FIGS. 1-21, above, in embodiments.

FIG. 22 depicts a schematic view of a control system 2200 for the brush chipper machine 100 discussed in FIGS. 1-21, above. The control system 2200 may include aspects of the control system discussed in FIGS. 9-10 of U.S. Pat. No. 7,562,837 to Vermeer Corporation, which is incorporated by reference in its entirety herewith. Control system 2200 includes a controller 2202, a winch control sub-system 2206, and a feed roller control sub-system 2204. Controller 2202 may be similar to controller 11 of U.S. Pat. No. 7,562,837 and include any of the features described therein in addition to those described herein.

Controller 2202 includes at least one input 2208 including one or more of a winch rope stowage interlock signal 2210, a boom-position interlock signal 2212, a boom locking pin signal 2213, a hold-to-run/reset button signal 2214, and an emergency stop signal (not shown) such as that generated from an emergency stop button or control bar of the machine 100. The winch rope stowage interlock signal 2210 may be a signal received from the hook interlock sensor 1912 discussed above. The boom-position interlock signal 2212 may be a signal received from the sensor 1932 discussed above. The boom locking pin signal 2213 may be a signal received from the boom locking pin sensor 2007 discussed above. The hold-to-run/reset button signal 2214 may be a signal received from a hold-to-run/reset button 2216, which may be similar to the hold-to-run/reset button 12 discussed in U.S. Pat. No. 7,562,837.

Based on the one or more input 2208, the controller 2202 generates one or more outputs 2218. The outputs 2218 may include one or more of winch control signal 2220, first feed roller control signal 2222, and second feed roller control signal 2224. The winch control signal 2220 controls rotation of the winch drum 802. For example, the winch control signal 2220 may control the winch motor 422 to either stop rotation of the winch drum 802, or to restrict the rotation of the winch drum 802 (e.g., to lower speeds), or allow normal rotation of the winch drum 802. Restricted rotation of the winch drum 802 may include controlling rotation of the winch drum 802 such that a given threshold tension (or tension range) within the winch rope 424 is maintained, and/or limiting the rotational speed of the winch drum 802. Normal (or unrestricted) rotation of the winch drum 802 may include manual (e.g., via use of the freewheel system 410), electronic, hydraulic, or otherwise regular operation of the winch motor 422 (e.g., retracting/extending the winch rope 424 as desired). In some embodiments, the winch control signal 2220 controls a winch selector valve 2226, which is downstream from a manual (or electrical) winch control valve 2228. As such, the winch control signal 2220 may override (or restrict) the setting of the winch control valve 2228. The winch control signal 2220 may control rotation of the winch drum 802 in other manners without departing from the scope hereof, such as via control of a brake associated with the winch drum 802.

The first and second feed roller control signals 2222, 2224 operate to control the feed mechanism 304 in a normal operation mode, or a "locked-off" operation mode. The normal operation includes rotation control and down pressure control of feed rollers as if the winch is not in use as known in the art. "Locked-off" operation mode overrides, disables, or reverses rotation of the feed mechanism 304 such that material cannot be fed into the machine 100. In the embodiment shown in FIG. 22, the first and second feed roller control signals 2222, 2224 control respective feed roller control valves 2230, which in turn operate to control a left motor 2232 and a right motor 2234 for rotating the feed mechanism 304 discussed above.

Figure 23:
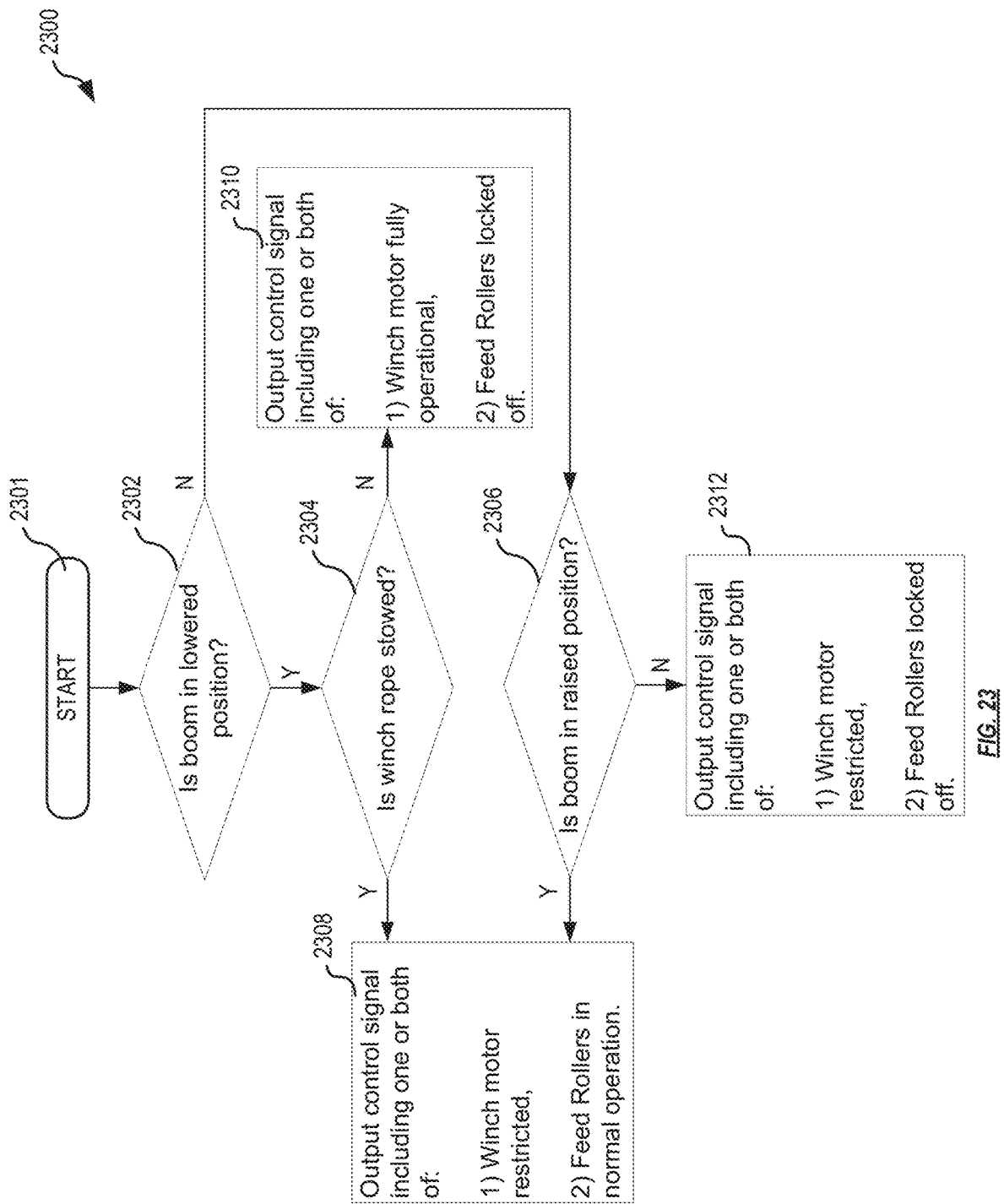
FIG. 23 depicts a block diagram illustrating a method for controlling a self-raising winch boom system, such as the winch of FIGS. 1-22, in embodiments.

FIG. 23 depicts a block diagram illustrating a method 2300 for controlling a self-raising winch boom, such as winch boom 102 of FIGS. 1-22. The method 2300 may additionally be used for controlling a machine associated with the winch, such as brush chipping machine 100. Method 2300 may be implemented within controller 2202 discussed above.

Method 2300 begins with decision 2302. Decision 2302 determines if the winch boom is in a lowered position. In one example of operation of decision 2302, the controller 2202 analyzes the boom-position interlock signal 2212 to determine if the winch boom 404 is in a lowered position. For example, the controller 2202 may determine if the boom-position interlock signal 2212 is at or below a lowered position threshold or is sensed by a proximity sensor in the lowered position. Optionally, and in addition, the controller 2202 may also confirm that the boom locking pin signal 2213 indicates that the locking pin 2006 is positioned in a locking aperture (which would be the lowered-position locking aperture 2008 when the boom 404 is in the lowered position). If the winch boom is in a lowered position, method 2300 proceeds with block 2304, else method 2300 proceeds with block 2306.

Block 2304 is a decision. At block 2304, method 2300 determines if the winch rope is stowed. In one example of block 2304, the controller 2202 analyzes the interlock hook signal 2210 to determine if the winch rope 424 is attached to hook 1910 with sufficient tension. If the winch rope is in a stowed position, method 2300 proceeds with block 2308, else method 2300 proceeds with block 2310.

Block 2306 is a decision. At block 2306, method 2300 determines if the boom is in a raised position. In one example of operation of decision 2302, the controller 2202 analyzes the boom-position interlock signal 2212 to determine if the boom 404 is in a raised position. For example, the controller 2202 may determine if the boom-position interlock signal 2212 is at or above a raised position threshold or is sensed by a proximity sensor in the raised position. Optionally, and in addition, the controller 2202 may also confirm that the boom locking pin signal 2213 indicates that the locking pin 2006 is positioned in a locking aperture (which would be the raised-position locking aperture 2108 when the boom 404 is in the raised position). If the winch boom is in a raised position, method 2300 proceeds with block 2308, else method 2300 proceeds with block 2312.

At block 2308, the method 2300 generates an output including one or both of (1) a restriction on the winch motor and (2) feed rollers in normal operation. In a first embodiment of block 2308, where method 2300 operates to control a winch alone, controller 2202 outputs winch control signal 2220 to restrict rotation of the winch drum 802. The restriction may be a reduced power (e.g. electrical or hydraulic) to the winch motor 422 to reduce the speed/force of retraction of the winch rope 424, or it may be a complete stop of the motor 422. In a second embodiment of block 2308, where method 2300 operates to control a winch and a brush chipping machine (such as brush chipping machine 100), the controller 2202 outputs the winch control signal 2220 discussed above in the first embodiment of block 2308, and outputs one or both of the first and second feed roller control signals 2222, 2224 to control the feed mechanism 304. The controller 2202 may control other devices than the feed mechanism 304, such as the cutter drum, or other material reduction machines (if the winch boom 102 is associated with another machine other than the brush chipping machine 100).

At block 2310, the method 2300 generates an output including one or both of (1) normal operation of the winch motor and (2) feed rollers locked off. In a first embodiment of block 2310, where method 2300 operates to control a winch alone, controller 2202 outputs winch control signal 2220 to allow normal rotation of the winch drum 802. In a second embodiment of block 2310, where method 2300 operates to control a winch and a brush chipping machine (such as brush chipping machine 100), the controller 2202 outputs the winch control signal 2220 discussed above in the first embodiment of block 2310, and outputs one or both of the first and second feed roller control signals 2222, 2224 to stop operation of the feed mechanism 304.

At block 2312, the method 2300 generates an output including one or both of (1) a restriction on the winch motor and (2) feed rollers locked off. In a first embodiment of block 2312, where method 2300 operates to control a winch alone, controller 2202 outputs winch control signal 2220 to restrict rotation of the winch drum 802. The restriction may be a reduced power (e.g. electrical or hydraulic) to the winch motor 422 to reduce the speed/force of retraction of the winch rope 424, or it may be a complete stop of the motor 422. In a second embodiment of block 2312, where method 2300 operates to control a winch and a brush chipping machine (such as brush chipping machine 100), the controller 2202 outputs the winch control signal 2220 discussed above in the first embodiment of block 2312, and outputs one or both of the first and second feed roller control signals 2222, 2224 to stop operation of the feed mechanism 304.

At any time during method 2300, if a reset signal is received, method 2300 may reset to block 2301 and restart the method. In one example of this reset, the controller 2202 may receive the hold-to-run/reset button signal 2214, which may be a signal received from a hold-to-run/reset button 2216.

Figure 24:
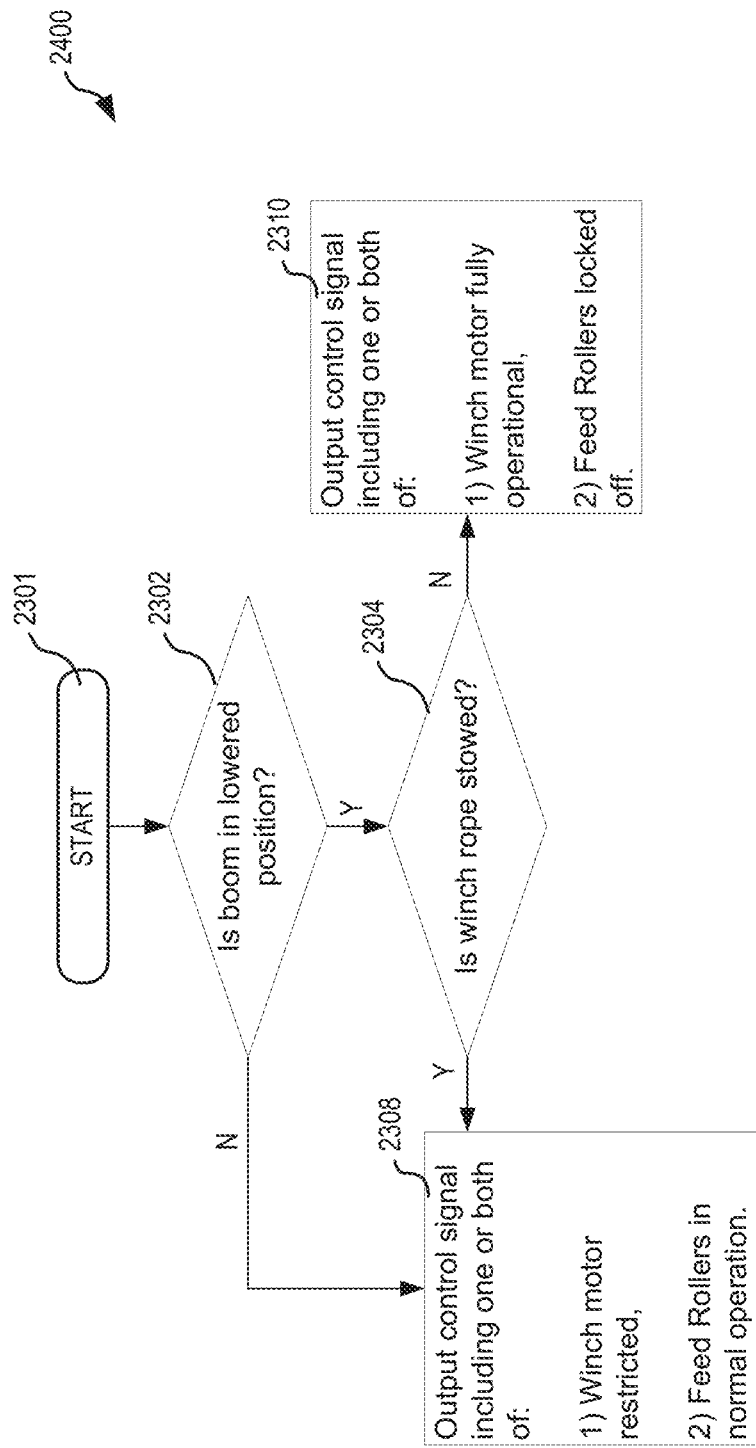
FIG. 24 depicts a block diagram illustrating another method for controlling a self-raising winch, such as the winch of FIGS. 1-22, in embodiments.

FIG. 24 depicts a block diagram illustrating a method 2400 for controlling a self-raising winch boom, such as winch boom 102 of FIGS. 1-22. The method 2400 may additionally be used for controlling a machine associated with the winch, such as brush chipping machine 100. Method 2400 may be implemented within controller 2202 discussed above.

Method 2400 is the similar to method 2300, and includes steps 2301, 2302, 2304, 2308, and 2310 discussed above. Method 2400 includes a binary decision of whether the boom 404 is in a lowered position or not at step 2302 (and thus does not include steps 2306 and 2312). This step may alternatively be a binary decision of whether the boom 404 is in a raised position or not. If the boom 404 is not in a lowered position at step 2302, the method 2400 proceeds with step 2308. If the boom 404 is in the lowered position at step 2302, the method 2400 proceeds with step 2304.

Figure 25:
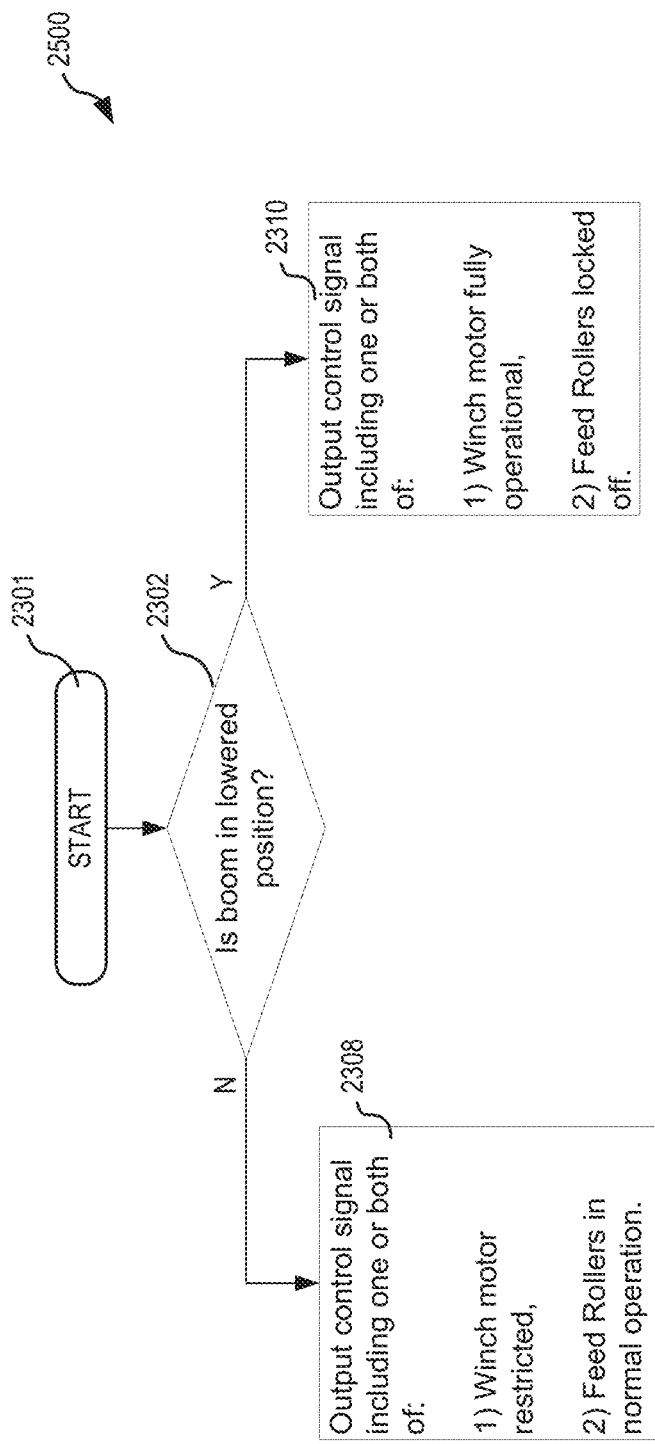
FIG. 25 depicts a block diagram illustrating another method for controlling a self-raising winch, such as the winch of FIGS. 1-22, in embodiments.

FIG. 25 depicts a block diagram illustrating a method 2500 for controlling a self-raising winch boom, such as winch boom 102 of FIGS. 1-22. The method 2500 may additionally be used for controlling a machine associated with the winch, such as brush chipping machine 100. Method 2500 may be implemented within controller 2202 discussed above.

Method 2500 is the similar to methods 2300 and 2400, and includes steps 2301, 2302, 2308, and 2310 discussed above. Method 2500 includes a binary decision of whether the boom 404 is in a lowered position or not at step 2302 (similar to method 2400 and thus does not include steps 2306 and 2312). However, unlike method 2400, method 2500 does not consider whether the rope 424 is stowed or not at step 2304. In method 2500, if the boom 404 is in the lowered position at step 2302, the method 2500 proceeds directly to step 2310, else the method proceeds directly to step 2308.

FIG. 26 depicts a block diagram illustrating a method 2600 for controlling a self-raising winch boom, such as winch boom 102 of FIGS. 1-22. The method 2600 may additionally be used for controlling a machine associated with the winch, such as brush chipping machine 100. Method 2600 may be implemented within controller 2202 discussed above.

Method 2600 is the similar to methods 2300, 2400, and 2500, and includes steps 2301, 2302, 2306, 2308, 2310, and 2312 discussed above. Method 2600 determines whether the boom 404 is in a lowered position or not at step 2302 (similar to method 2300). However, unlike method 2300, method 2600 does not consider whether the rope is stowed or not at step 2304 if the boom 404 is in the lowered position at step 2302. Instead, if the boom 404 is in the lowered position at step 2302, method 2600 proceeds directly to step 2310, else method proceeds to step 2306. In method 2600, if at step 2306 it is determined that the boom 404 is in the raised portion, method 2600 proceeds with step 2308, else method proceeds with step 2312.

FIGS. 23-26 show the concept that various aspects of method 2300 may be included, or not, and combined in multiple ways without departing from the scope hereof. Additionally, each of the illustrated methods can optionally include a determination by the controller 2200 as to whether the locking pin 2006 is extended to reside in one of the locking apertures 2008, 2108, or is retracted, meaning it is not in either of the locking apertures 2008, 2108. When the controller 2200 determines that the locking pin is retracted and not in either of the locking apertures 2008, 2108, winch motor operation can be restricted.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A winch boom system comprising:
a winch drum attached to a winch shaft such that rotation of the winch shaft about a shaft axis rotates the winch drum;
a boom pivotably coupled to the winch shaft for rotation about the shaft axis; and
a winch rope wound about the winch drum and extending from the boom at a point distal from the winch drum.

2. The winch boom system of claim 1, wherein the winch rope is configured to anchor at an anchor location, the winch rope, the boom, and the winch drum being configured such that:
tightening of the winch rope when the winch rope is anchored causes the boom to raise between a lowered position and a raised position, and
loosening of the winch rope when the winch rope is anchored causes the boom to lower between the raised position and the lowered position.

3. The winch boom system of claim 2, wherein the winch shaft is supported by a frame, the frame including a lower boom stop against which the boom rests when in the lowered position.

4. The winch boom system of claim 3, further including a locking pin, the boom including a lowered-position locking aperture, the locking pin configured to be inserted into the lowered-position locking aperture when the boom is at the lowered position.

5. The winch boom system of claim 4, the boom further comprising a raised-position locking aperture, the locking pin configured to be inserted into the raised-position locking aperture when the boom is at the raised position.

6. The winch boom system of claim 5, further comprising a sensor configured to detect whether the locking pin is inserted in one of the lowered-position locking aperture or the raised-position locking aperture, the sensor being in communication with a winch motor to restrict operation of the winch motor when the locking pin is not in either one of the lowered-position locking aperture or the raised-position locking aperture.

7. The winch boom of claim 6, wherein the restricted operation of the motor includes operation of the motor at less than a maximum speed.

8. The winch boom system of claim 4, wherein the locking pin is spring biased.

9. The winch boom system of claim 3, the frame including an upper boom stop against which the boom rests when in the raised position.

10. The winch boom system of claim 1, wherein the winch rope extends through a cavity within the boom.

11. The winch boom system of claim 1, wherein the anchor location is on the boom.

12. The winch boom system of claim 11, wherein the anchor location is at an opening in the boom from which the winch rope extends.

13. The winch boom system of claim 1, wherein the winch rope is routed over a top of the winch drum.

14. The winch boom system of claim 1, further comprising a winch motor coupled to the winch shaft.

15. The winch boom system of claim 14, wherein the winch motor is hydraulic.

16. The winch boom system of claim 1, further comprising a winch motor coupled to the winch shaft and a freewheel system that controls a clutch associated with the motor and the shaft to allow manual unwinding of the winch rope about the winch drum.

17. The winch boom system of claim 1, further comprising an interlock configured to control a device other than the winch boom system.

18. The winch boom system of claim 17, the interlock including a rope stowage interlock having an interlock hook configured for engagement by the winch rope.

19. The winch boom system of claim 17, the interlock including a boom-position interlock including a boom-position sensor configured to detect a position of the boom.

20. A winch boom system comprising:
a frame,
a shaft supported by the frame;
a winch drum attached to the shaft such that rotation of the shaft about a shaft axis rotates the winch drum;
a boom pivotably coupled to the frame for movement between a raised position and a lowered position, the boom defining a cavity in which the winch drum is positioned; and
a winch rope wound about the winch drum, passing through the cavity of the boom, and extending from the boom at a point distal from the winch drum.

21. The winch boom system of claim 20, wherein the boom is pivotably coupled to the shaft for rotation about the shaft axis.

22. The winch boom system of claim 20, wherein the winch rope is configured to anchor at an anchor location, the winch rope, the boom, and the winch drum being configured such that:
tightening of the winch rope when the winch rope is anchored causes the boom to raise between the lowered position and the raised position, and
loosening of the winch rope when the winch rope is anchored causes the boom to lower between the raised position and the lowered position.

23. The winch boom system of claim 22, further including a locking pin, the boom including a lowered-position locking aperture, the locking pin configured to be inserted into the lowered-position locking aperture when the boom is at the lowered position.

24. The winch boom system of claim 23, the boom further comprising a raised-position locking aperture, the locking pin configured to be inserted into the raised-position locking aperture when the boom is at the raised position.

25. The winch boom system of claim 24, further comprising a sensor configured to detect whether the locking pin is inserted in one of the lowered-position locking aperture or the raised-position locking aperture, the sensor being in communication with a winch motor to restrict operation of the winch motor when the locking pin is not in either one of the lowered-position locking aperture or the raised-position locking aperture.

26. The winch boom system of claim 25, wherein the restricted operation of the motor includes operation of the motor at less than a maximum speed.

27. The winch boom system of claim 23, wherein the locking pin is spring biased.

28. The winch boom system of claim 20, further comprising a winch motor coupled to the shaft and a freewheel system that controls a clutch associated with the motor and the shaft to allow manual unwinding of the winch rope about the winch drum.

29. The winch boom system of claim 20, further comprising an interlock configured to control a device other than the winch boom system.

30. The winch boom system of claim 29, the interlock including a rope stowage interlock having an interlock hook configured for engagement by the winch rope.

31. The winch boom system of claim 29, the interlock including a boom-position interlock including a boom-position sensor configured to detect a position of the boom.

32. A self-raising winch boom system comprising:
a frame;
a shaft supported by the frame;
a winch drum attached to the shaft such that rotation of the shaft about a shaft axis rotates the winch drum;
a motor coupled to the shaft to selectively drive rotation of the shaft;
a boom pivotably coupled to the shaft for rotation about the shaft, the boom defining a cavity in which the winch drum is positioned; and
a winch rope wound about the winch drum, passing through the cavity of the boom, and extending from the boom at a point distal from the winch drum;
wherein the winch rope is configured to anchor at an anchor location on the boom, the winch rope, the boom, and the winch drum being configured such that:
tightening of the winch rope when the winch rope is anchored causes the boom to raise between a lowered position and a raised position, and
loosening of the winch rope when the winch rope is anchored causes the boom to lower between the raised position and the lowered position.

* * * * *